United States Patent
Wang et al.

(10) Patent No.: US 8,355,210 B2
(45) Date of Patent: Jan. 15, 2013

(54) ZOOM CAMERA MODULE

(75) Inventors: Chy-Lin Wang, Taipei (TW); Chir-Weei Chang, Taoyuan County (TW); Ling-Ta Su, Taipei (TW); Ping-Chung Lin, Taipei (TW)

(73) Assignees: Industrial Technology Research Institute, Hsinchu (TW); Taiwan Creative Sensor Inc., Taipei County (TW)

( * ) Notice: Subject to any disclaimer, the term of this patent is extended or adjusted under 35 U.S.C. 154(b) by 571 days.

(21) Appl. No.: 12/625,503

(22) Filed: Nov. 24, 2009

(65) Prior Publication Data

US 2011/0058258 A1   Mar. 10, 2011

(30) Foreign Application Priority Data

Sep. 9, 2009 (TW) ............................... 98130393 A

(51) Int. Cl.
   *G02B 3/12* (2006.01)
   *G02B 15/14* (2006.01)
(52) U.S. Cl. .......................... 359/666; 359/682; 359/689
(58) Field of Classification Search .................. 359/689, 359/665–667, 680–682
See application file for complete search history.

(56) References Cited

U.S. PATENT DOCUMENTS

| | | | |
|---|---|---|---|
| 7,317,580 B2* | 1/2008 | Kogo et al. | 359/666 |
| 2003/0179464 A1* | 9/2003 | Amanai | 359/685 |
| 2005/0200973 A1 | 9/2005 | Kogo et al. | |
| 2007/0097515 A1* | 5/2007 | Jung et al. | 359/666 |
| 2007/0247727 A1 | 10/2007 | Kim | |

FOREIGN PATENT DOCUMENTS

CN    101390009 A    3/2009
JP    2006-308999    11/2006

OTHER PUBLICATIONS

"First Office Action of China Counterpart Application", issued on Sep. 23, 2011, p. 1-p. 5.
U.S. Appl. No. 12/620,597, filed Nov. 18, 2009, Chy-Lin Wang et al.

* cited by examiner

*Primary Examiner* — Scott J Sugarman
(74) *Attorney, Agent, or Firm* — Jianq Chyun IP Office

(57) ABSTRACT

A zooming camera module includes a first lens group, a second lens group, and a third lens group. The first lens group is implemented on an optical axis at a fixed position, and has a negative total optical power. The second lens group is implemented on the optical axis and can be moved back and forth along the optical axis, to achieve zooming and focusing. The second lens group has a positive total optical power, and includes a liquid lens unit and at least one lens with non-zero optical power, wherein the at least one lens and the liquid lens are separately or integrally configured. The third lens group is implemented on the optical axis at a fixed position, and has a non-zero total optical power.

21 Claims, 23 Drawing Sheets

(a)

(b)

ZOOM CAMERA MODULE

CROSS-REFERENCE TO RELATED APPLICATION

This application claims the priority benefit of Taiwan application serial no. 98130393, filed Sep. 9, 2009. The entirety of the above-mentioned patent application is hereby incorporated by reference herein and made a part of specification.

BACKGROUND

1. Technical Field

The disclosure relates to a zoom camera module. More particularly, the disclosure relates to a camera module having a liquid lens to achieve focusing and zooming.

2. Description of Related Art

A zoom camera module is a basic function module required for capturing images. In a conventional optical technique, a lens group is generally formed by solid-state optical devices. To achieve effective zooming and focusing, the conventional lens group may have a great size and a complicate structure.

A liquid lens is also provided the conventional optical technique, in which an interface formed by two different kinds of liquid. The two kinds of liquid are not immiscible to each other and have different refraction index to form the interface but the densities are similar. The interface has a curvature, and the curvature of the interface can be changed according to an electrowetting mechanism.

Though the liquid lens is used in the zoom camera module to replace the solid-state optical device, it may have different design effect due to different design combinations. How to merge the liquid lens to design a more efficient zoom camera module is still a subject to be researched and developed by related practitioners.

SUMMARY

The disclosure provides a zoom camera module including a first lens group, a second lens group, and a third lens group. The first lens group is disposed on an optical axis at a fixed position, and has a negative total optical power. The second lens group is disposed on the optical axis, and can be moved back and forth along the optical axis to achieve zooming and focusing simultaneously. The second lens group has a positive total optical power and further includes a liquid lens unit and at least one lens with a non-zero optical power, wherein the at least one lens and the liquid lens unit are separately or integrally configured. The third lens group is disposed on the optical axis at a fixed position and has a non-zero total optical power.

In order to make the aforementioned and other features of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

The disclosure provides a zoom camera module including three lens groups. The first lens group has a negative total optical power and a position of the first lens group is fixed. The second lens group has a positive total optical power, and is formed by at least one lens with a non-zero optical power and a liquid lens, for example. The second lens group can be moved along an optical axis to achieve zooming operation. A moving direction of the second lens group from an image side to an object side is an effect for changing from a wide-position to a tele-position. When the second lens group is moved along the optical axis for zooming, the liquid lens is used for compensating an image plane position and compensating the image plane position in a case of being same magnification and different object distances. The liquid lens is formed by two kinds of liquid, wherein the two kinds of liquid are immiscible and have different refraction indexes and similar densities. To change optical power, a curvature of an interface formed by the two kinds of immiscible liquid can be changed according to an external control. The third lens group at a fixed position includes at least one lens with a non-zero optical power.

Embodiments are provided below to describe the disclosure in detail, thought the disclosure is not limited by the provided embodiments, and the embodiments can be mutually combined to form other embodiments.

Figure 1:
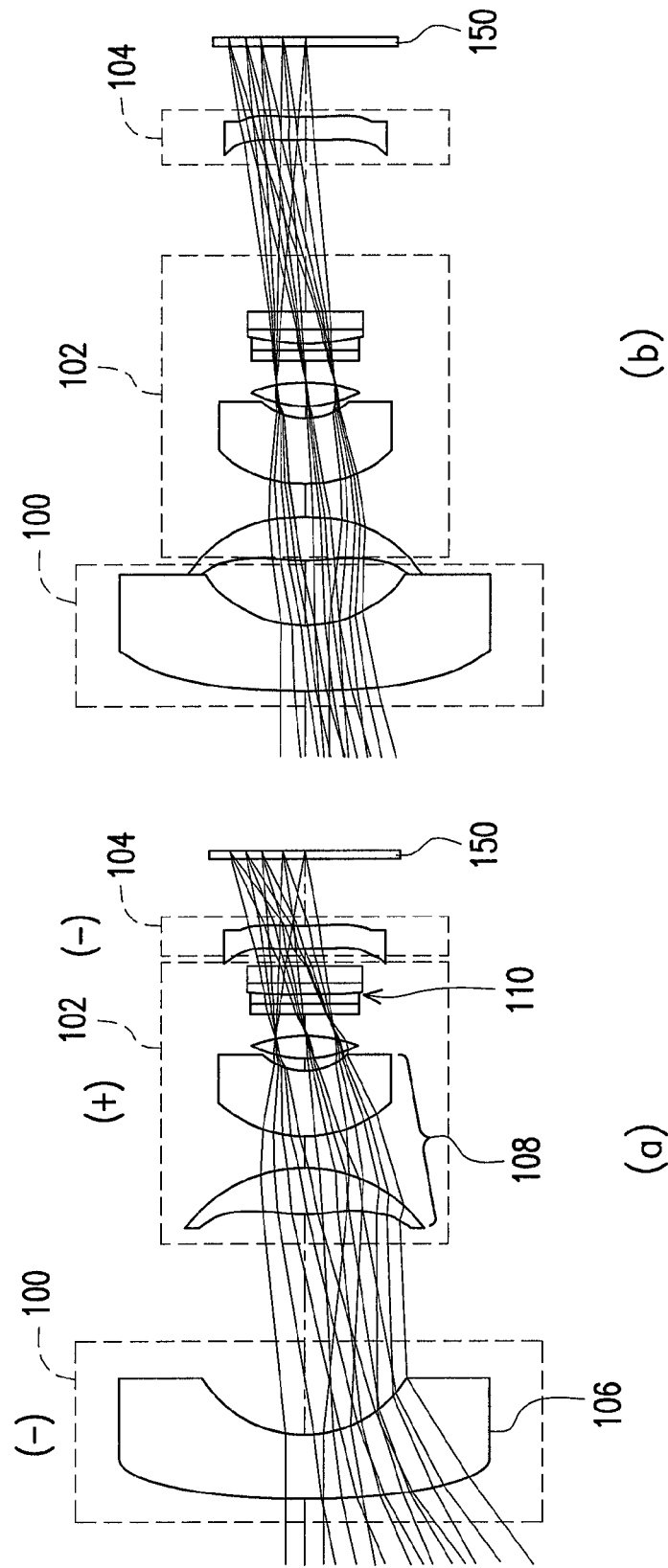
FIG. 1 is cross-sectional view of a zoom camera module having a liquid lens according to an embodiment of the disclosure.

FIG. 1 is cross-sectional view of a zoom camera module having a liquid lens according to an embodiment of the disclosure. Referring to FIG. 1(a), the zoom camera module of the present embodiment includes three lens groups 100, 102 and 104. The lens group 100 and the lens group 104 are disposed at fixed positions. The lens group 102 can be moved along the optical axis. An image of an object can be formed on an image sensor panel 150 through the lens group 104 to obtain a picture. In the present embodiment, the object is located at a left side, which is also referred to as an object side, and an imaging position is located at a right side, which is also referred to as an image side.

The lens group 100 is formed by at least one lens, and a preferable and simple implementation thereof is that the lens group 100 is formed by a lens 106, and a total optical power thereof is negative, for example. For example, the lens 106 is a convex-concave lens individually having a negative optical power. Certainly, according to a design of optical lens, the negative total optical power for the lens group can also be implemented by a plurality of lenses.

In the present embodiment, the optical axis is a straight line. However, if necessary, the lens group 100 can also include a light deflection optical device. For example, a prism can be used to change a path direction of the optical axis, and a method thereof is described later.

The lens group 102 is disposed on the optical axis, and can be moved back and forth along the optical axis to achieve zooming operation for the wide-position and the tele-position. FIG. 1(a) illustrates a situation that the lens group 102 is configured at the wide-position, wherein an object distance is 2 m. FIG. 1(b) illustrates a situation that the lens group 102 is configured at the tele-position. In other words, a position variation of the lens group 102 changed from the wide-position to the tele-position is done by a movement of the lens group 102 from the image side to the objective side, i.e. a movement from the right to the left.

Not only the focusing and the zooming operations can be achieved according to the movement of the lens group 102, but also a higher image height can be achieved according to the lens group 102, so that the image height is not influenced by an aperture limitation of the liquid lens, wherein the higher image height represents that the image sensor panel 150 with a larger area is used, and the image sensor panel 150 with larger area may contain more pixels, which can present a higher resolution.

A total optical power of the lens group 102 is positive. The lens group 102 includes at least one lens and a liquid lens unit 110. The at least one lens is a sub-lens group 108 formed by solid-state lenses. The liquid lens unit 110 has an adjustable optical power. The sub-lens group 108 includes at least one lens individually with a non-zero optical power, and the sub-lens group 108 and the liquid lens unit 110 can be separately or integrally configured. Moreover, the lens group 102 can include a stop, which is disposed between the sub-lens group 108 and the liquid lens unit 110 for increasing an amount of entering light.

The lens group 104 is disposed on the optical axis at a fixed position, and has a non-zero total optical power. A relationship between the lens group 104 and other two lens groups 100 and 102 is that the lens group 102 is located between the lens group 100 and the lens group 104. The lens group 104 includes at least one lens individually with a non-zero optical power, and the lens group 104 is preferably formed by a single lens. In the present embodiment, a total optical power of the lens group 104 is negative.

Figure 2:
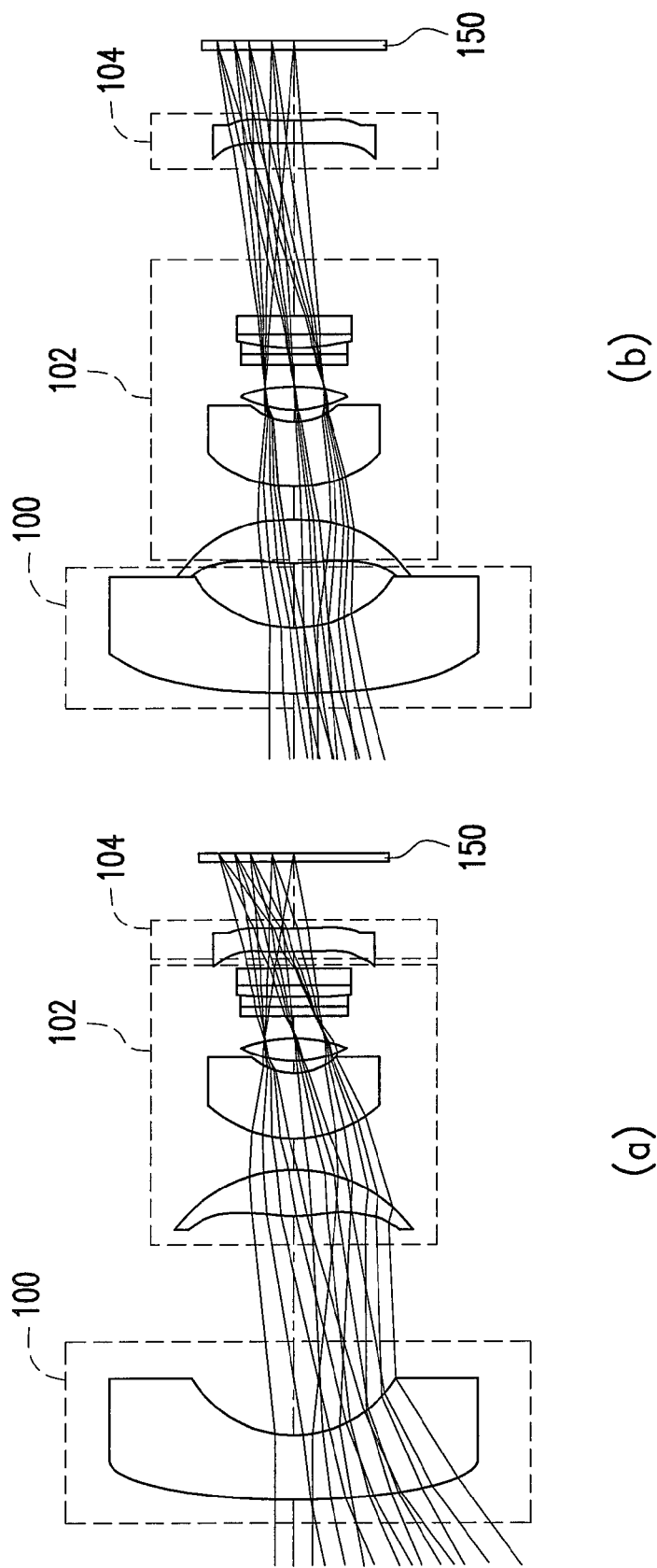
FIGS. 2-3 are cross-sectional views of a zoom camera module having a liquid lens of FIG. 1 corresponding to different object distances according to an embodiment of the disclosure.
Figure 3:
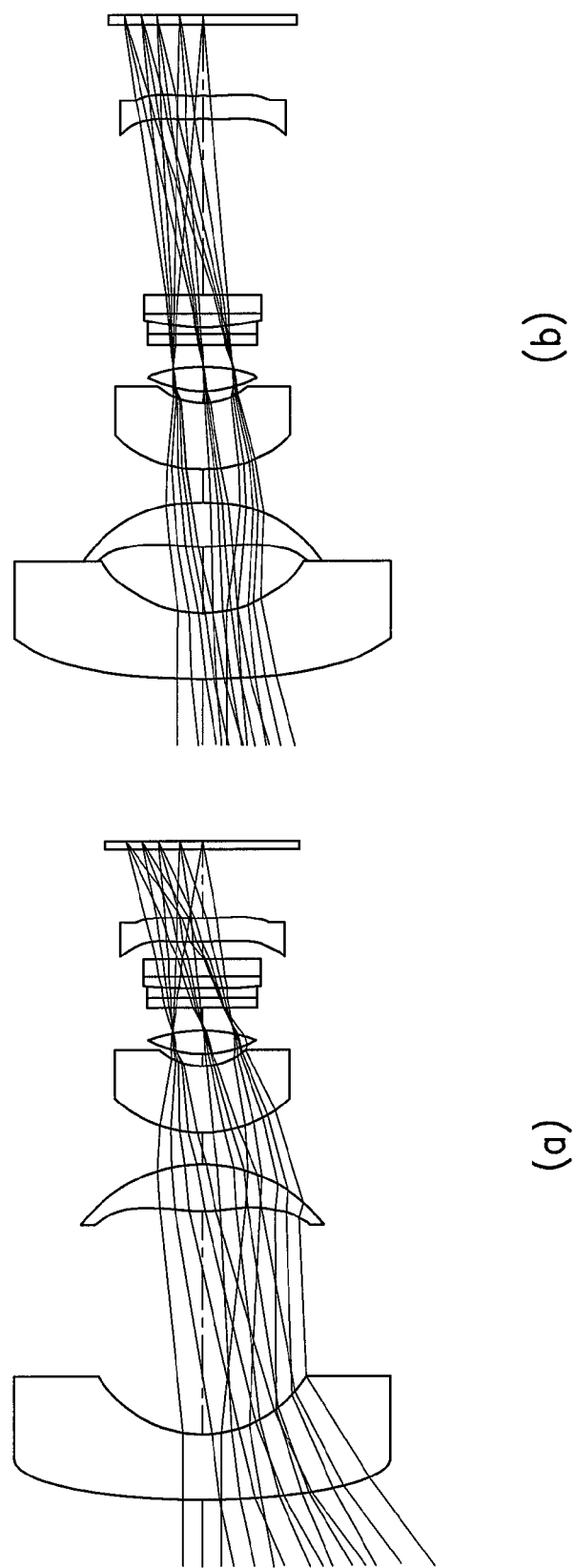

FIGS. 2-3 are cross-sectional views of the zoom camera module having the liquid lens of FIG. 1 corresponding to different object distances according to an embodiment of the disclosure.

Referring to FIG. 2, a structure of FIG. 2 is the same to that of FIG. 1, though the lens group 102 may have different positions when an imaging operation is performed in a case that an object distance is 25 cm. In FIG. 2(a), the position of the lens group 102 is configured at the wide-position. In FIG. 2(b), the position of the lens group 102 is configured at the tele-position. Moreover, the optical power of the liquid lens unit 110 is accordingly varied to compensate an imaging position. Variation of the optical power of the liquid lens unit 110 can be achieved by changing a curvature of a liquid interface in the liquid lens unit 110 through an external control.

Referring to FIG. 3, a structure of FIG. 3 is also the same to that of FIG. 1, though the imaging operation is performed in a case that the object distance is 10 cm. In FIG. 3(a), the position of the lens group 102 is configured at the wide-position. In FIG. 3(b), the position of the lens group 102 is configured at the tele-position. Similarly, the curvature of the liquid interface in the liquid lens unit 110 can also vary in accordance with a change from the wide-position to the tele-position, such as varying more convex to the objective side.

Figure 4:
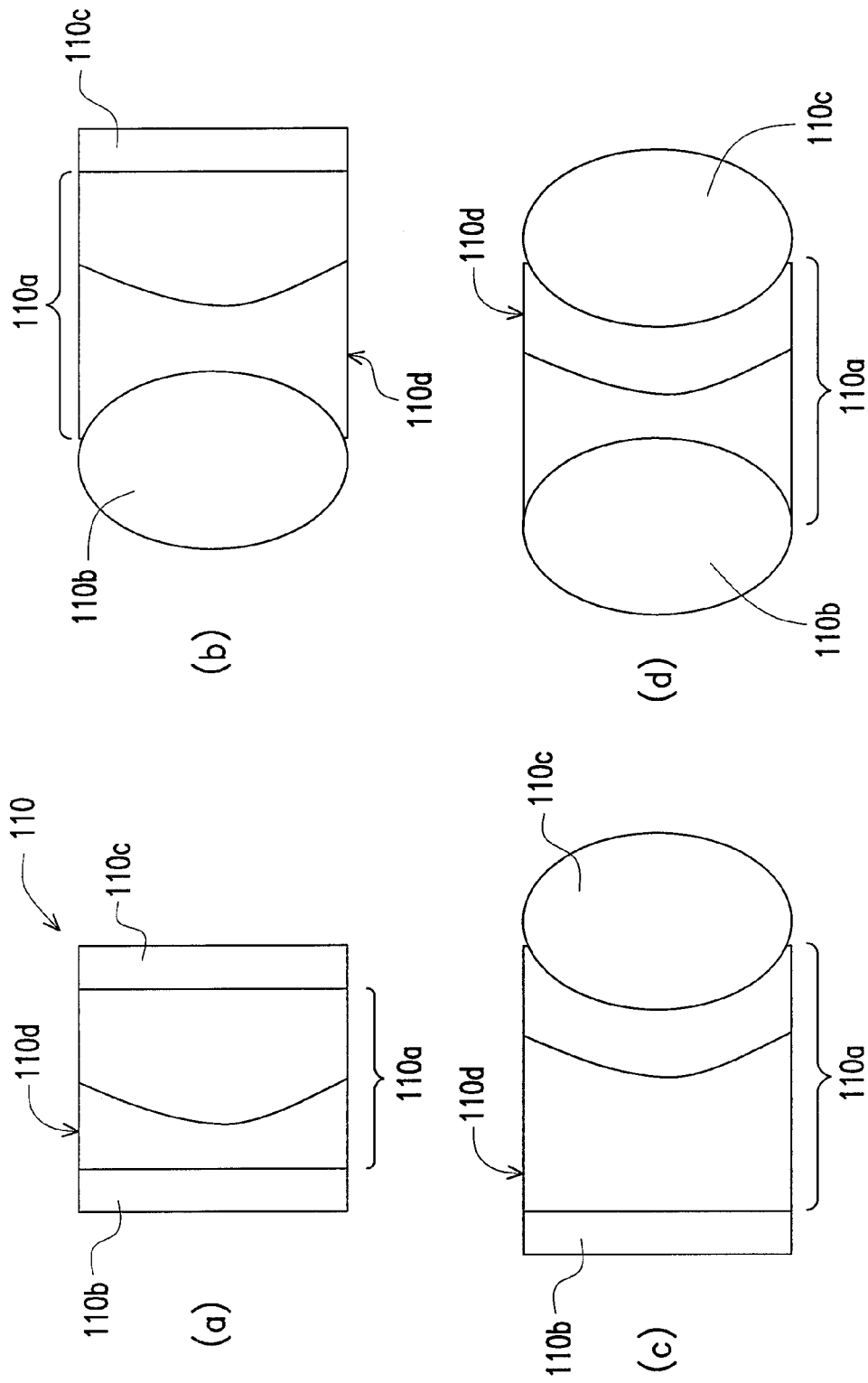
FIG. 4 is a cross-sectional view of structure variations of a liquid lens unit 110 according to an embodiment of the disclosure.

FIG. 4 is a cross-sectional view of structure variations of the liquid lens unit 110 according to an embodiment of the disclosure. Referring to FIG. 4(a), regarding a structure of a conventional liquid lens, the liquid lens unit 110 may include a liquid part 110a including two kinds of liquid (for example, water and oil), two transparent substrates 110b and 110c with zero optical power and located at two ends of the liquid part 110a, and an outer wall structure surrounding the liquid part 110a to form the liquid lens unit 110. In the conventional structure, the outer wall structure may have an electrode structure, so that the curvature of the liquid interface can be changed through a well-known electrowetting mechanism.

Referring to FIG. 4(b), based on the conventional structure of FIG. 4(a), and the total optical power required by the sub-lens group 108 in the lens group 102, the sub-lens group 108 can be integrated with the liquid lens unit 110. Namely, the transparent substrate 110b of FIG. 4(a) may also have a non-zero optical power, to replace at least a part of members in the sub-lens group 108.

Referring to FIG. 4(c), a mechanism of FIG. 4(c) is similar to that of FIG. 4(b), in which the transparent substrate 110c of FIG. 4(a) is changed to a structure having a non-zero optical power. It is a consideration on an integral design of the sub-lens group 108 to have variation of the total optical power required by the lens group 102.

Referring to FIG. 4(d), a mechanism of FIG. 4(d) is similar to that of FIG. 4(b), in which the two transparent substrates 110b and 110c of FIG. 4(a) are all changed to the structures having non-zero optical powers. It is also a consideration on the integral design of the sub-lens group 108 to have variation of the total optical power required by the lens group 102 is also achieved.

Figure 5:
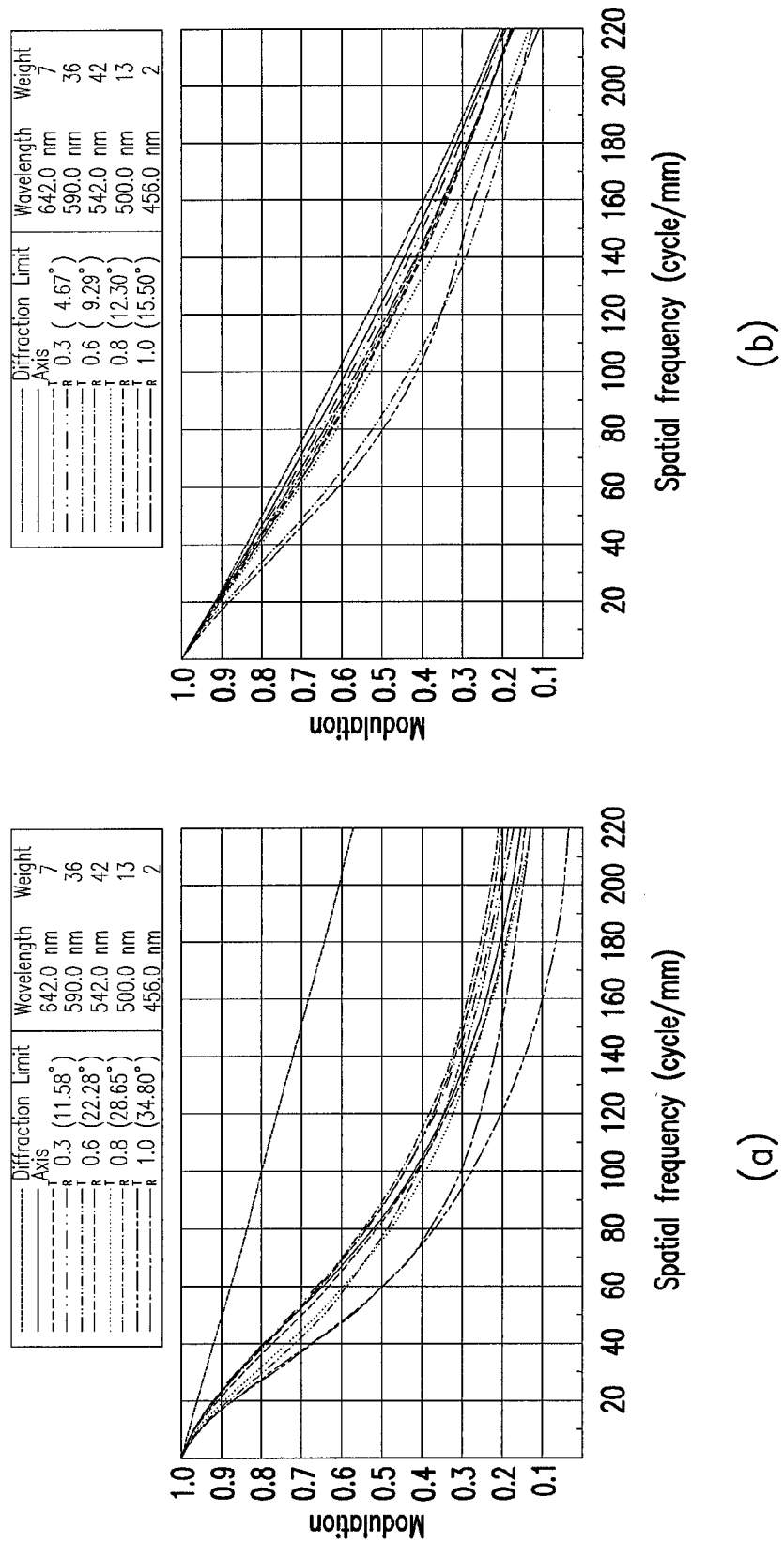
FIGS. 5-7 are characteristic simulation diagrams of a modulation transfer function (MTF) varied along with spatial frequencies according to embodiments of the disclosure.
Figure 6:
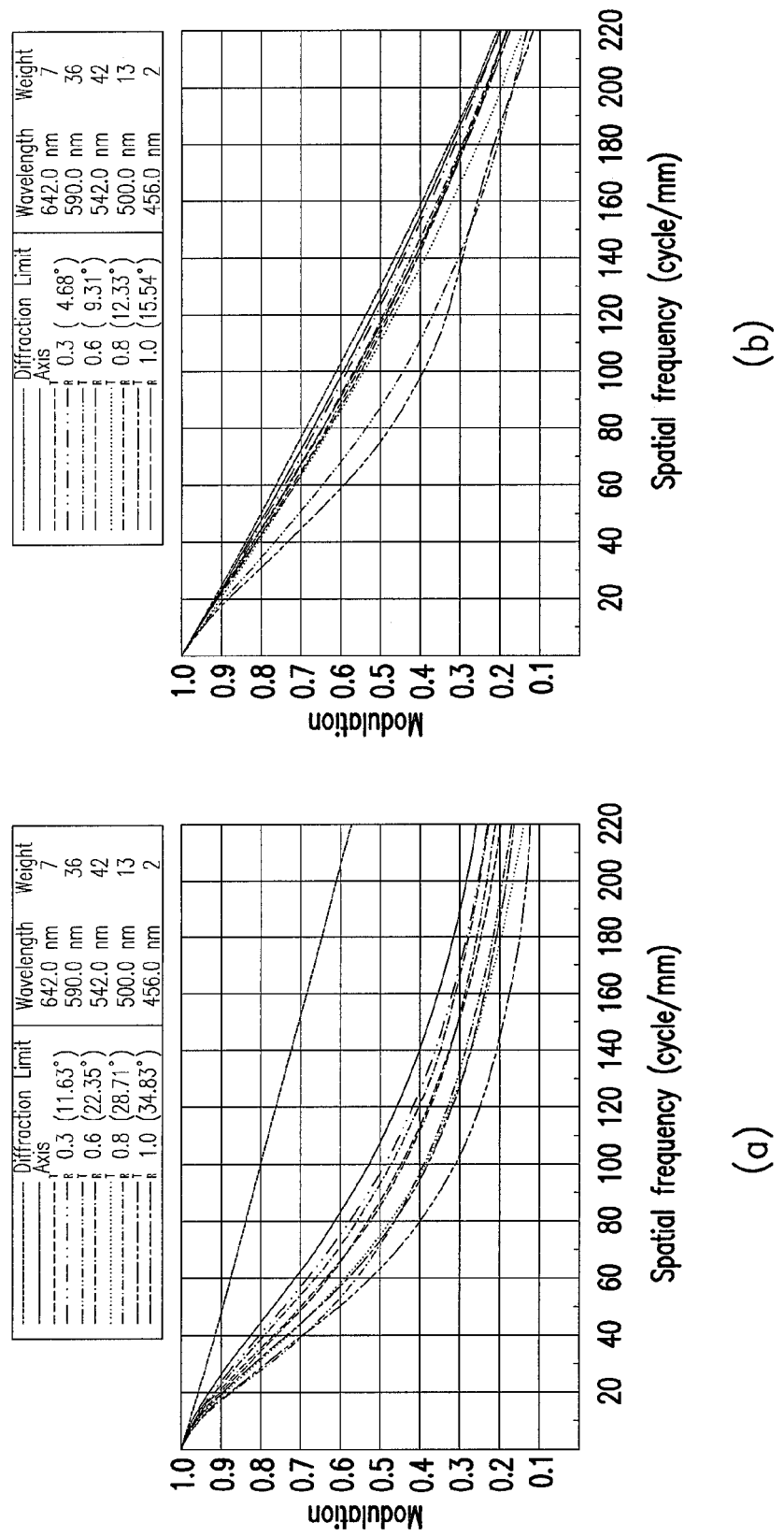
Figure 7:
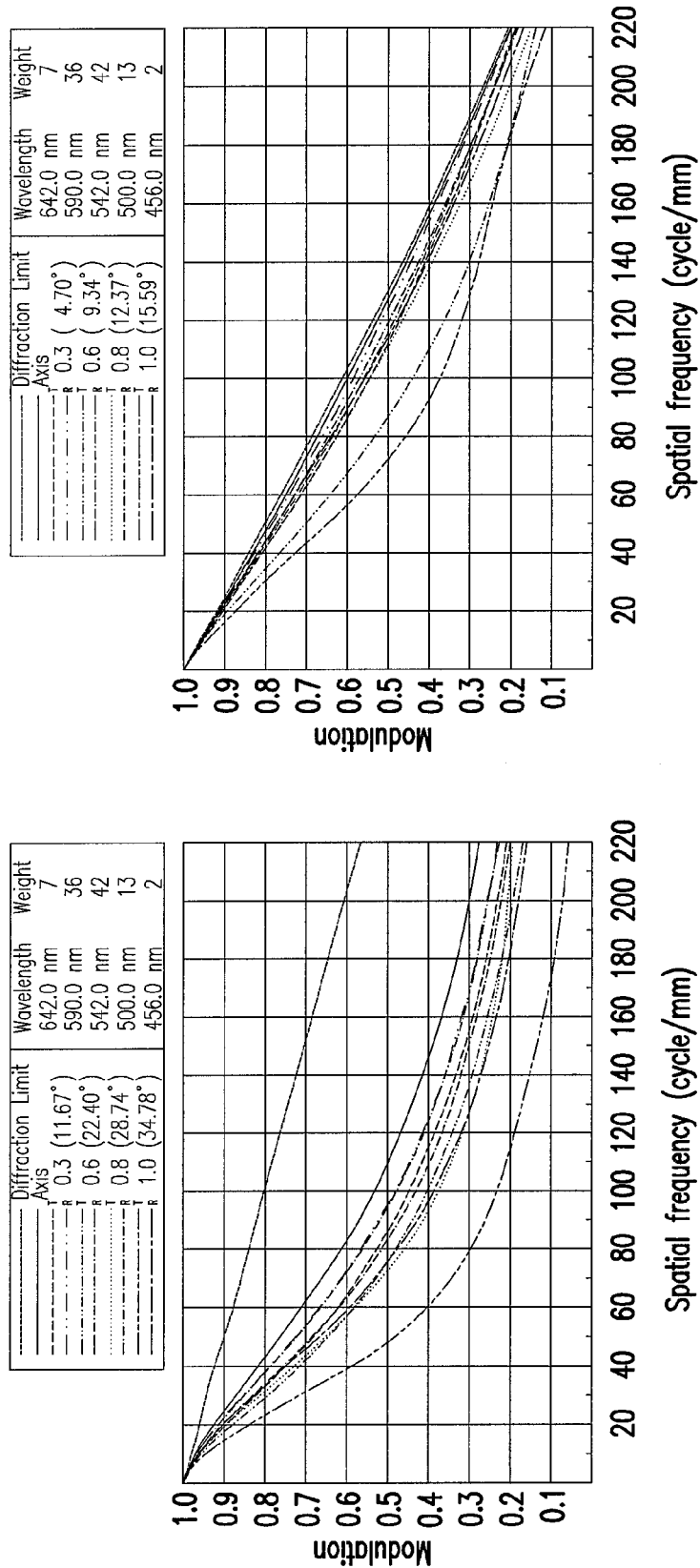

FIGS. 5-7 are characteristic simulation diagrams of a modulation transfer function (MTF) varied along with spatial frequencies according to embodiments of the disclosure. Referring to FIG. 5, corresponding to an operation condition of FIG. 1 with the object distance of 2 m, FIG. 5(a) illustrates a characteristic of the MTF at the wide-position, and FIG. 5(b) illustrates a characteristic of the MTF at the tele-position. Referring to FIG. 6, FIG. 6 illustrates a characteristic of the MTF corresponding to an operation condition of FIG. 2 with the object distance of 25 cm. Referring to FIG. 7, FIG. 7 illustrates a characteristic of the MTF corresponding to an operation condition of FIG. 3 with the object distance of 10 cm.

Figure 8:
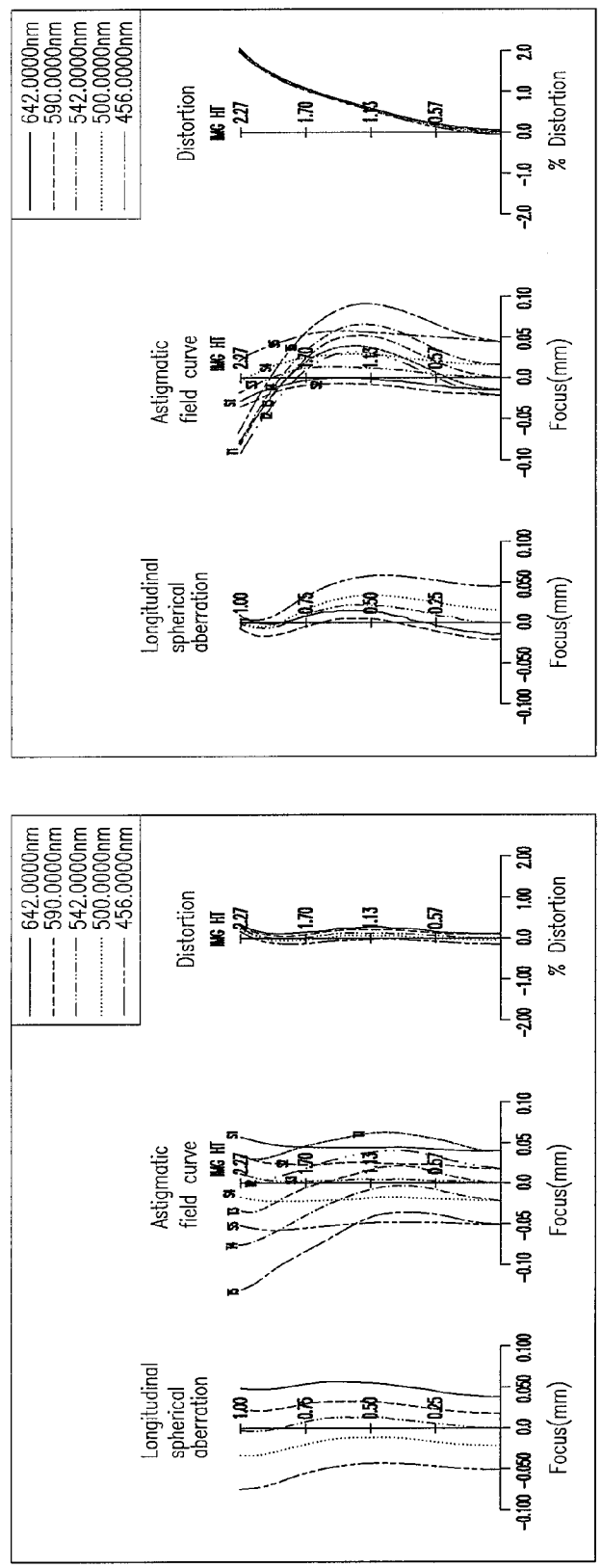
FIGS. 8-10 are characteristic simulation diagrams of longitudinal spherical aberration, astigmatic field curve and distortion according to embodiments of the disclosure.
Figure 9:
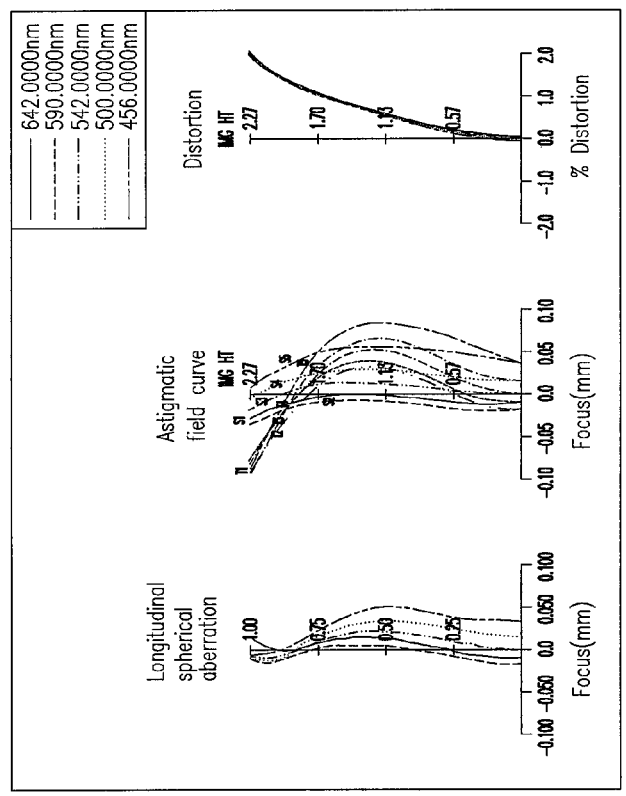
Figure 9:
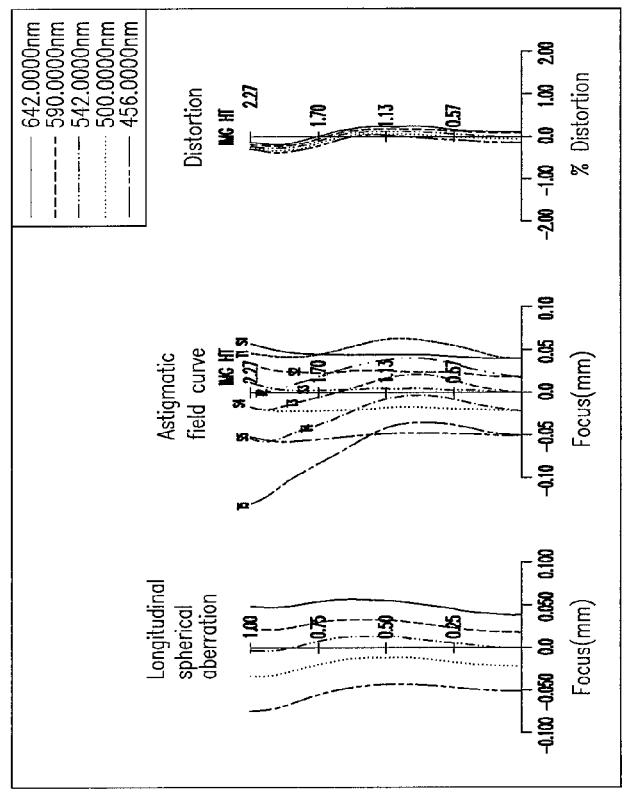
Figure 10:
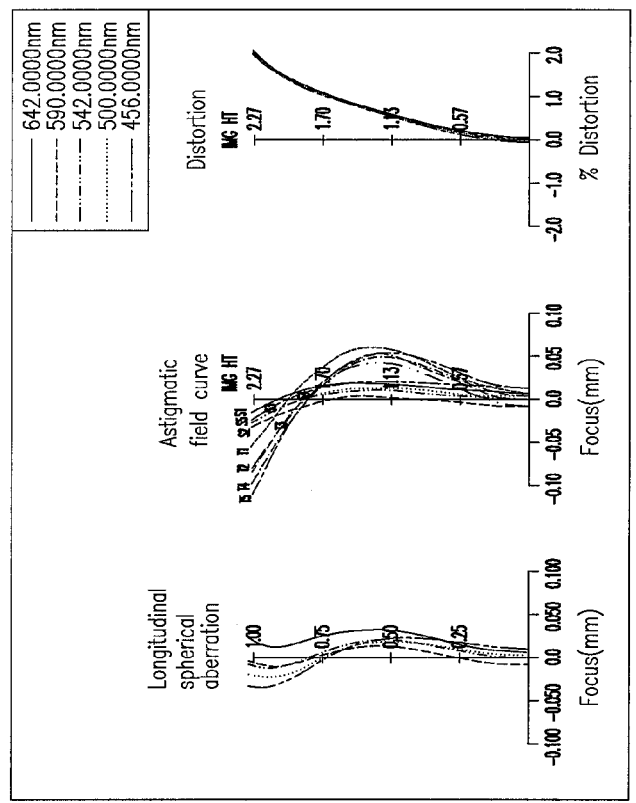
Figure 10:
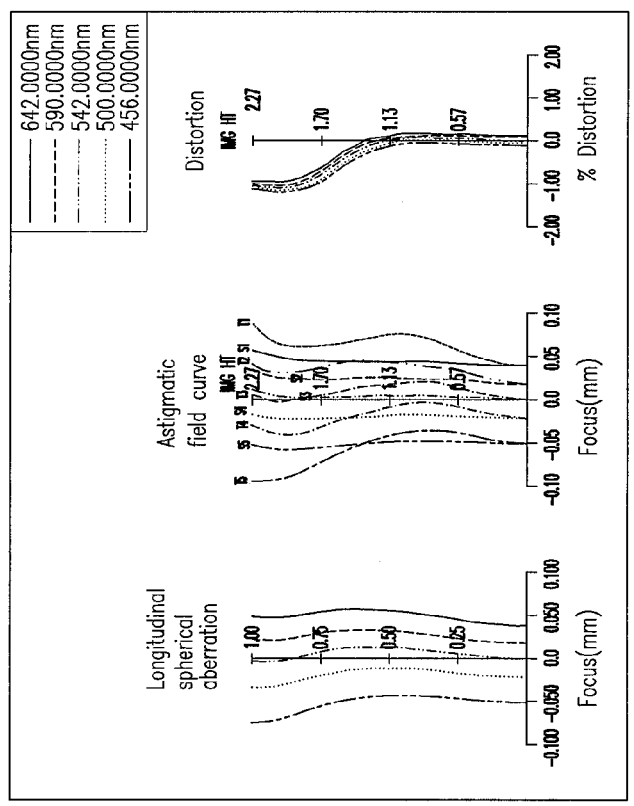

FIGS. 8-10 are characteristic simulation diagrams of longitudinal spherical aberration, astigmatic field curve and distortion according to embodiments of the disclosure. FIG. 8 illustrates characteristics of the longitudinal spherical aberration, the astigmatic field curve and the distortion corresponding to the operation condition of FIG. 1 with the object distance of 2 m, wherein FIG. 8(a) illustrates the characteristics corresponding to the wide-position, and FIG. 8(b) illustrates the characteristics corresponding to the tele-position. FIG. 9 illustrates characteristics of the longitudinal spherical aberration, the astigmatic field curve and the distortion corresponding to the operation condition of FIG. 2 with the object distance of 25 cm, wherein FIG. 9(a) illustrates the characteristics corresponding to the wide-position, and FIG. 9(b) illustrates the characteristics corresponding to the tele-position. FIG. 10 illustrates characteristics of the longitudinal spherical aberration, the astigmatic field curve and the distortion corresponding to the operation condition of FIG. 3 with the object distance of 10 cm, wherein FIG. 10(a) illustrates the characteristics corresponding to the wide-position, and FIG. 10(b) illustrates the characteristics corresponding to the tele-position.

According to the embodiment of FIG. 1, surface types, radiuses, thickness and materials of the lenses are listed in following Tables 1-4:

TABLE 1

| Surface No. | Surface type | Radius (mm) | Thickness (mm) | (Nd, Vd) |
|---|---|---|---|---|
| Object | Spherical surface | 1.0E+18 | 2000 * 1 | |
| 1 | Aspheric surface 1 | 23.99644 | 2 | 1.694, 56.3 |
| 2 | Aspheric surface 2 | 3.411349 | 6.813 * 2 | |
| 3 | Aspheric surface 3 | 9.307409 | 1.2624028 | 1.53, 55.7 |
| 4 | Aspheric surface 4 | −6.06272 | 0.9101773 | |
| 5 | Aspheric surface 5 | 4.863689 | 2 | 1.639, 23 |
| 6 | Aspheric surface 6 | 2.055857 | 0.3872687 | |
| 7 | Aspheric surface 7 | 3.739124 | 0.7 | 1.53, 55.7 |
| 8 | Aspheric surface 8 | −5.43358 | 0.1657301 | |
| Stop | Spherical surface | 1.0E+18 | 0.55 | |
| 10 | Spherical surface | 1.0E+18 | 0.3 | 1.51, 56.4 |
| 11 | Spherical surface | 1.0E+18 | 0.29 * 3 | 1.48, 38.4 |
| 12 | Spherical surface | 11.1735 * 5 | 0.36 * 4 | 1.39, 58.7 |
| 13 | Spherical surface | 1.0E+18 | 0.55 | 1.51, 56.4 |
| 14 | Spherical surface | 1.0E+18 | 0.622 * 6 | |
| 15 | Aspheric surface 9 | 6.840498 | 0.7 | 1.639, 23 |
| 16 | Aspheric surface 10 | 6.440547 | 2.0893555 | |
| 17 | Spherical surface | 1.0E+18 | 0.3 | 1.51, 56.4 |
| 18 | Spherical surface | 1.0E+18 | 0 | |
| Image | Spherical surface | 1.0E+18 | 0 | |

In the Table 1, the surface types are combination of spherical surfaces and aspheric surfaces, and 18 surfaces are included from the left to the right, i.e. from the lens 106 to a back surface of the image sensor panel 150. The back surface of the image sensor panel 150 is an imaging surface. The thickness refers to a thickness extending rightwards along the optical axis from the surface. The material is represented by a refraction index Nd and an abbe number Vd, wherein variations of the values marked with "*" are described by the Table 4.

Patterns of the aspheric surfaces are listed in the Table 2 and the Table 3. Table 4 lists positions corresponding to the wide-position and the tele-position in a case of three object distances of 2 m, 25 cm and 10 cm, which correspond to the thickness of the Table 1.

TABLE 2

| | Aspheric surface 1 | Aspheric surface 2 | Aspheric surface 3 | Aspheric surface 4 | Aspheric surface 5 |
|---|---|---|---|---|---|
| Y radius | 23.996439 | 3.4113491 | 9.3074094 | −6.062724 | 4.8636888 |
| Cone constant | 0 | 0 | 0 | 0 | 0 |
| $4^{th}$ coefficient | 0.0006844 | −0.001627 | −0.010807 | −0.002456 | 0.0087856 |
| $6^{th}$ coefficient | −5.8E−6 | −2.22E−5 | 1.24E−4 | −1.15E−4 | −0.000575 |
| $8^{th}$ coefficient | −2.19E−8 | 4.99E−6 | −2.6E−7 | −3.71E−6 | 6.47E−6 |
| $10^{th}$ coefficient | 6.12E−9 | −8.65E−7 | −2.27E−7 | 3.7E−10 | −1.65E−5 |

TABLE 3

| | Aspheric surface 6 | Aspheric surface 7 | Aspheric surface 8 | Aspheric surface 9 | Aspheric surface 10 |
|---|---|---|---|---|---|
| Y radius | 2.0558573 | 3.739124 | −5.43358 | 6.8404976 | 6.4405466 |
| Cone constant | 0.5203444 | 0 | 0 | 0 | 0 |
| $4^{th}$ coefficient | 0.0075245 | 0.003502 | −0.010958 | −0.024233 | −0.023648 |
| $6^{th}$ coefficient | −0.001743 | 0.000574 | −0.002027 | 0.0007279 | 0.0004971 |
| $8^{th}$ coefficient | −5.86E−5 | 8.56E−4 | 0.000626 | −7.92E−5 | −3.8E−5 |
| $10^{th}$ coefficient | −5.80E−4 | −3.32E−5 | −0.000289 | −5.12E−5 | −1.16E−5 |

TABLE 4

|  | *1 | *2 | *3 | *4 | *5 | *6 | F/# | Effect focal length |
|---|---|---|---|---|---|---|---|---|
| Wide | 2000 | 6.813032 | 0.29 | 0.36 | 11.17341 | 0.622034 | 2.798 | 3.2 |
| Tele | 2000 | 2 | 0.23 | 0.42 | 7.230376 | 5.435066 | 5.352 | 8 |
| Wide | 250 | 6.813032 | 0.31 | 0.34 | 13.4423 | 0.622034 | 2.802 | 3.15 |
| Tele | 250 | 2 | 0.25 | 0.4 | 9.398126 | 5.435066 | 5.34 | 7.77 |
| Wide | 100 | 6.813032 | 0.33 | 0.32 | 40.98428 | 0.622034 | 2.782 | 3.08 |
| Tele | 100 | 2 | 0.29 | 0.36 | 18.50362 | 5.435066 | 5.32 | 7.43 |

Figure 11:
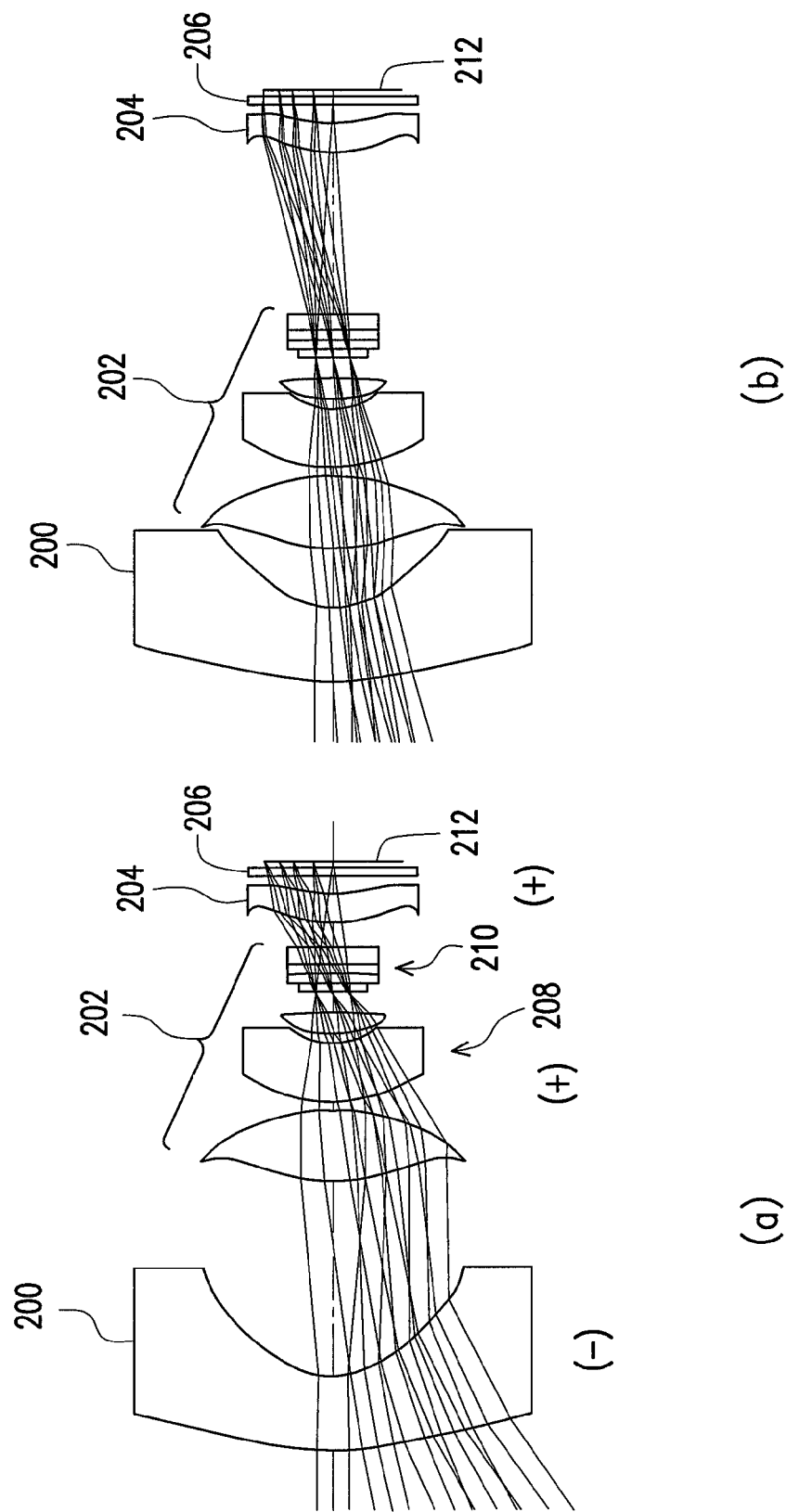
FIGS. 11-13 are cross-sectional views of a zoom cameral module according to another embodiment of the disclosure.
Figure 12:
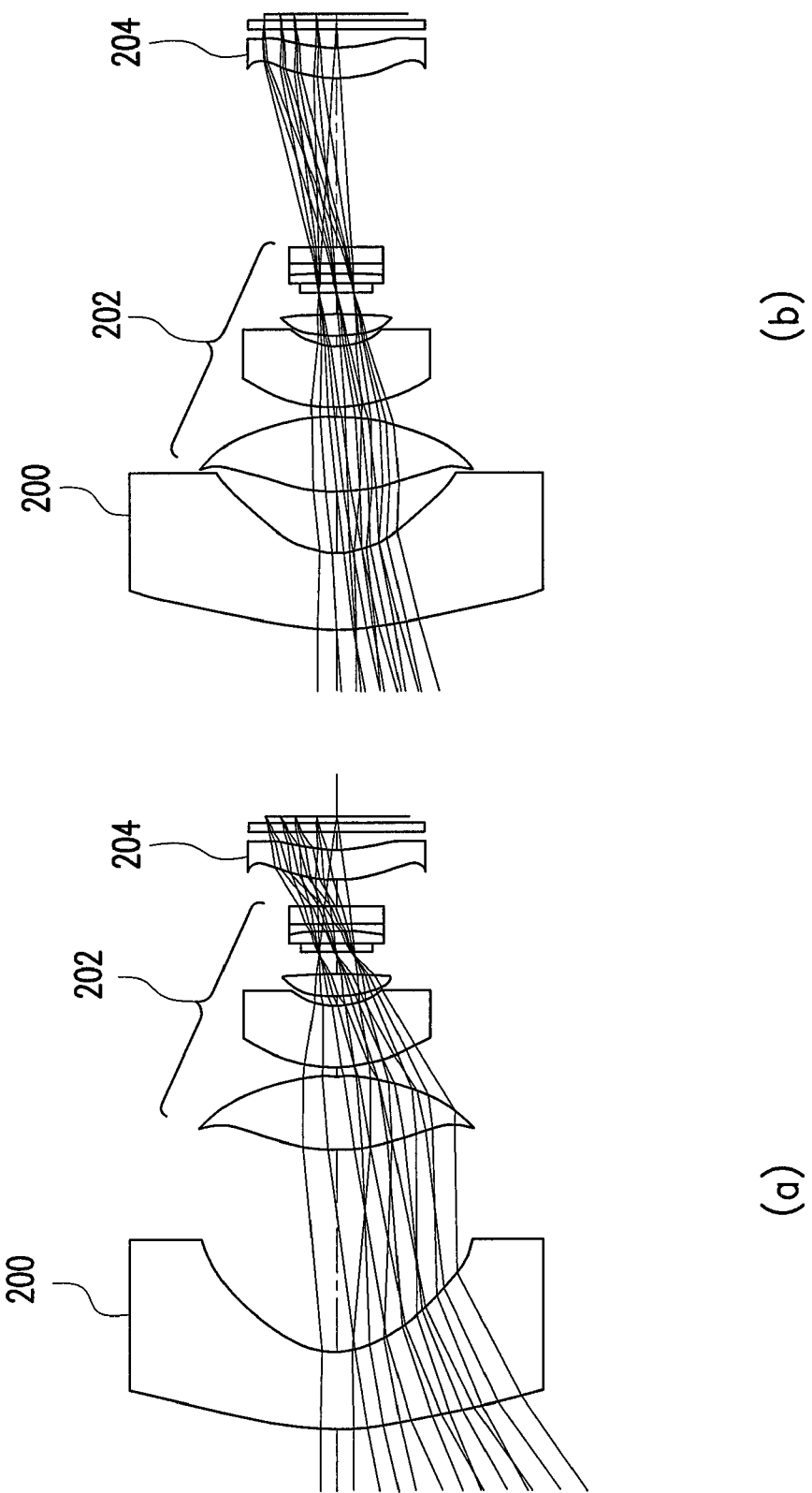
Figure 13:
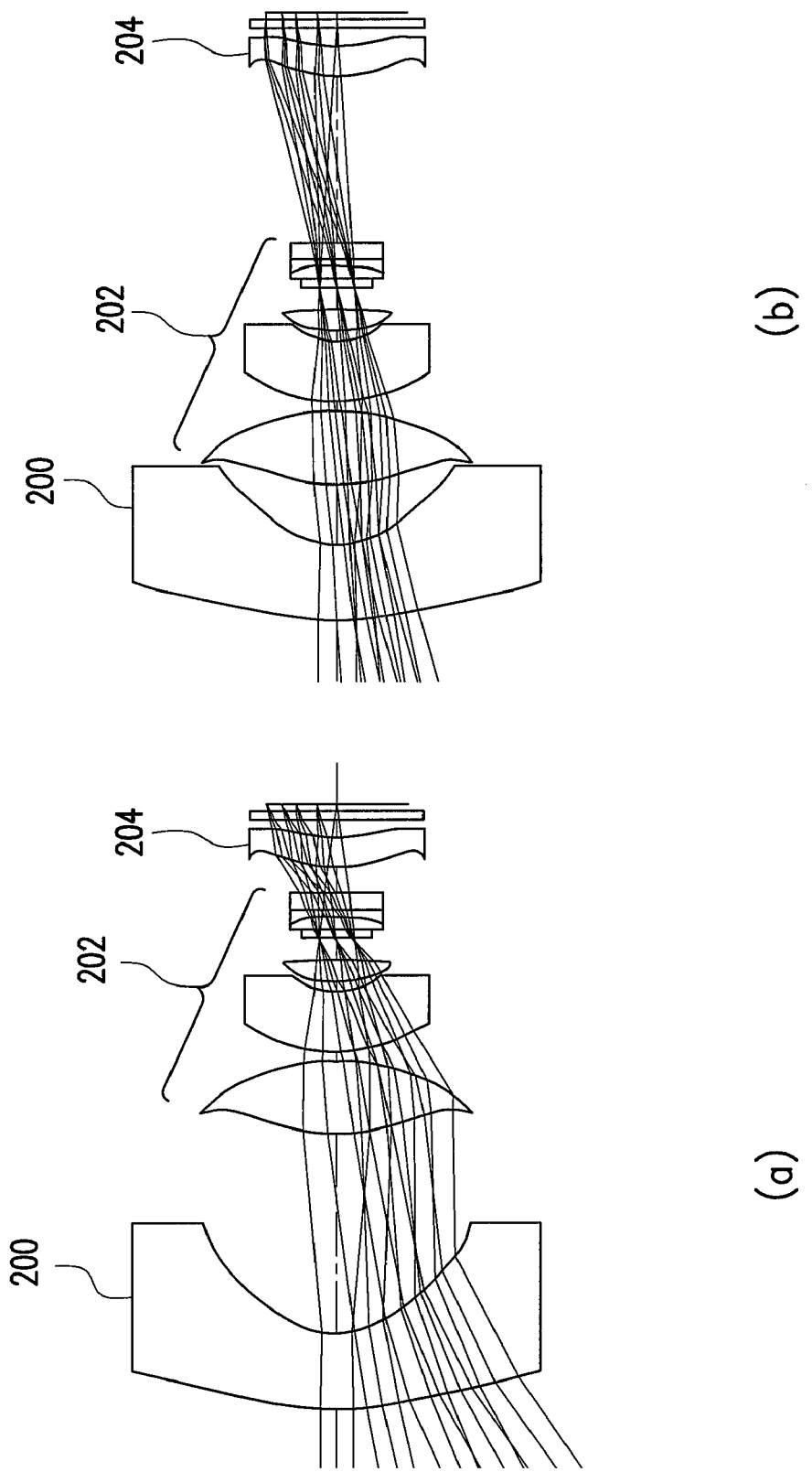

In the above embodiments, the total optical power of the lens group 104 is designed to be negative. However, the total optical power of the lens group 104 can also be designed to be positive. FIGS. 11-13 are cross-sectional views of a zoom cameral module according to another embodiment of the disclosure. Referring to FIG. 11, the zoom camera module of the present embodiment also includes three lens groups, and total optical powers of the three lens groups are respectively negative (−), positive (+) and positive (+). The lens group 200 is formed by a single lens. The lens group 202 includes a sub-lens group 208 and a liquid lens unit 210. The lens group 204 is also formed by a single lens. FIG. 11(a) illustrates a situation that the lens group 202 is configured at the wide-position and the object distance is 2 m. FIG. 11(b) illustrates a situation that the lens group 202 is configured at the tele-position and the object distance is 2 m. The operation of the lens group 202 is similar to that of the lens group 102 of FIG. 1 also for focusing and zooming, wherein an operation mechanism of the liquid lens unit 210 is also the same to that of the liquid lens unit 110 of FIG. 1.

In the embodiment of FIG. 11, since the total optical power of the lens group 204 is positive, an imaging plane 212 can be fall behind an image sensor panel 206. Certainly, this is not the only design approach.

In the embodiment of FIG. 12, FIG. 12(a) illustrates a situation that the lens group 202 is configured at the wide-position and the object distance is 25 cm. FIG. 12(b) illustrates a situation that the lens group 202 is configured at the tele-position and the object distance is 25 cm.

In the embodiment of FIG. 13, FIG. 13(a) illustrates a situation that the lens group 202 is configured at the wide-position and the object distance is 10 cm. FIG. 13(b) illustrates a situation that the lens group 202 is configured at the tele-position and the object distance is 10 m.

Figure 14:
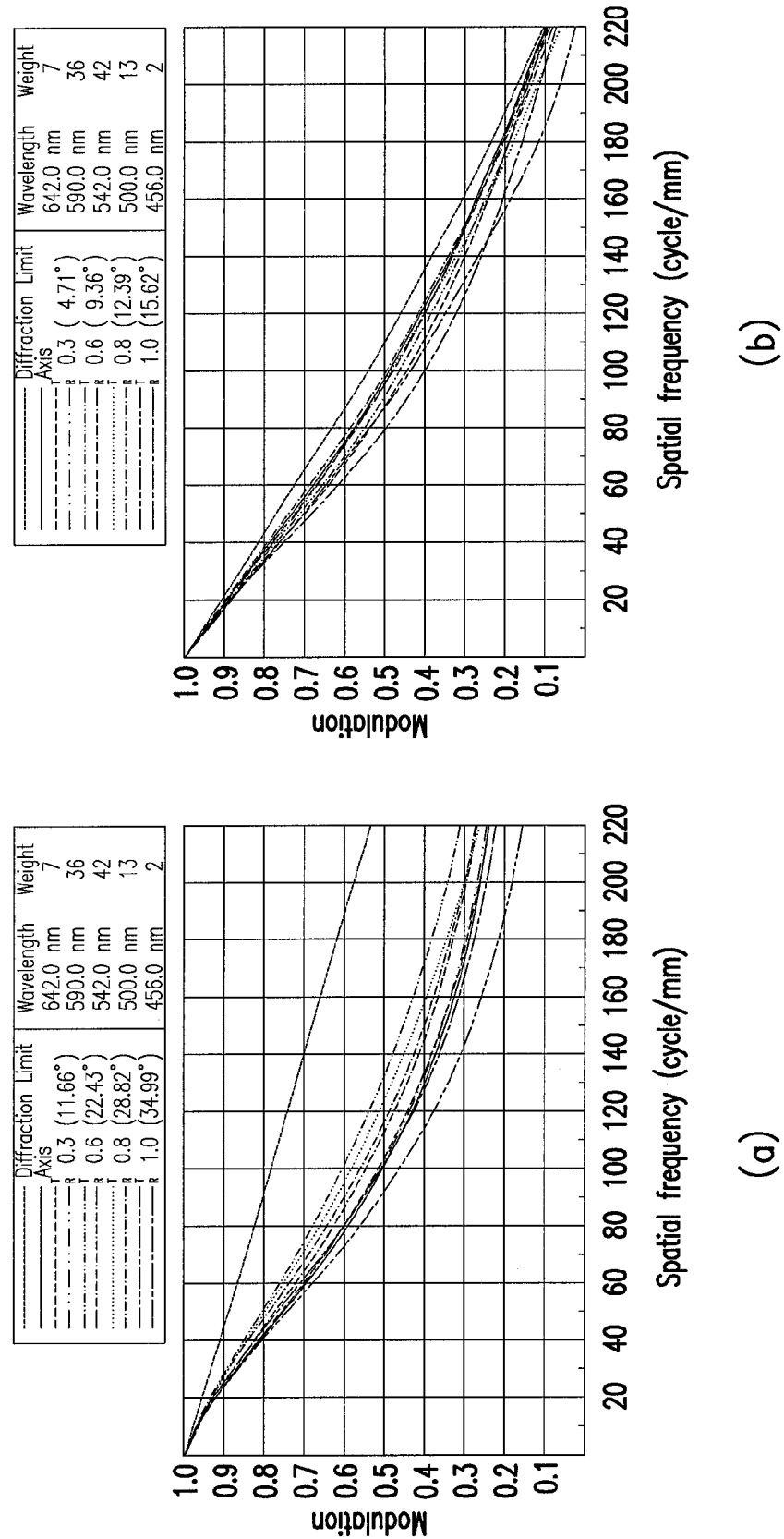
FIGS. 14-16 are characteristic simulation diagrams of an MTF varied along with spatial frequencies according to embodiments of the disclosure.
Figure 15:
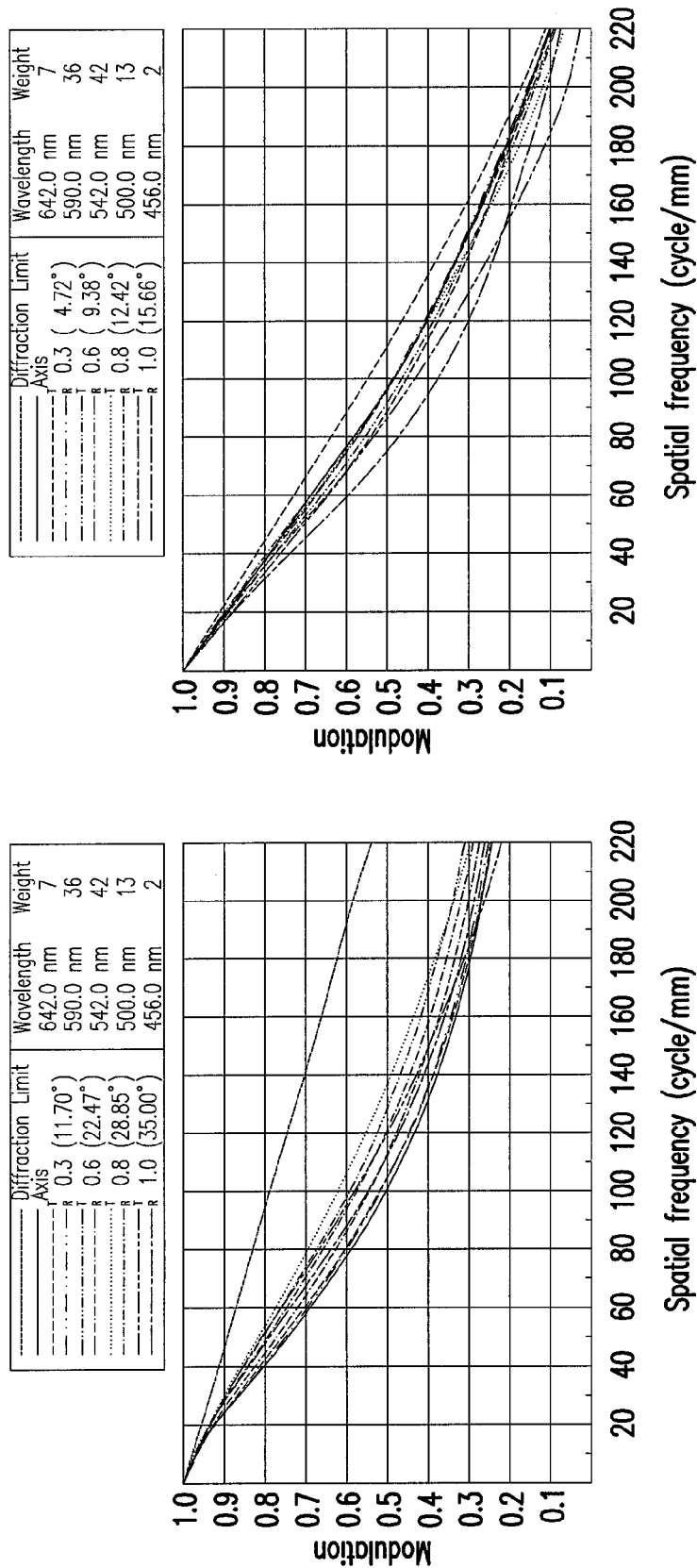
Figure 16:
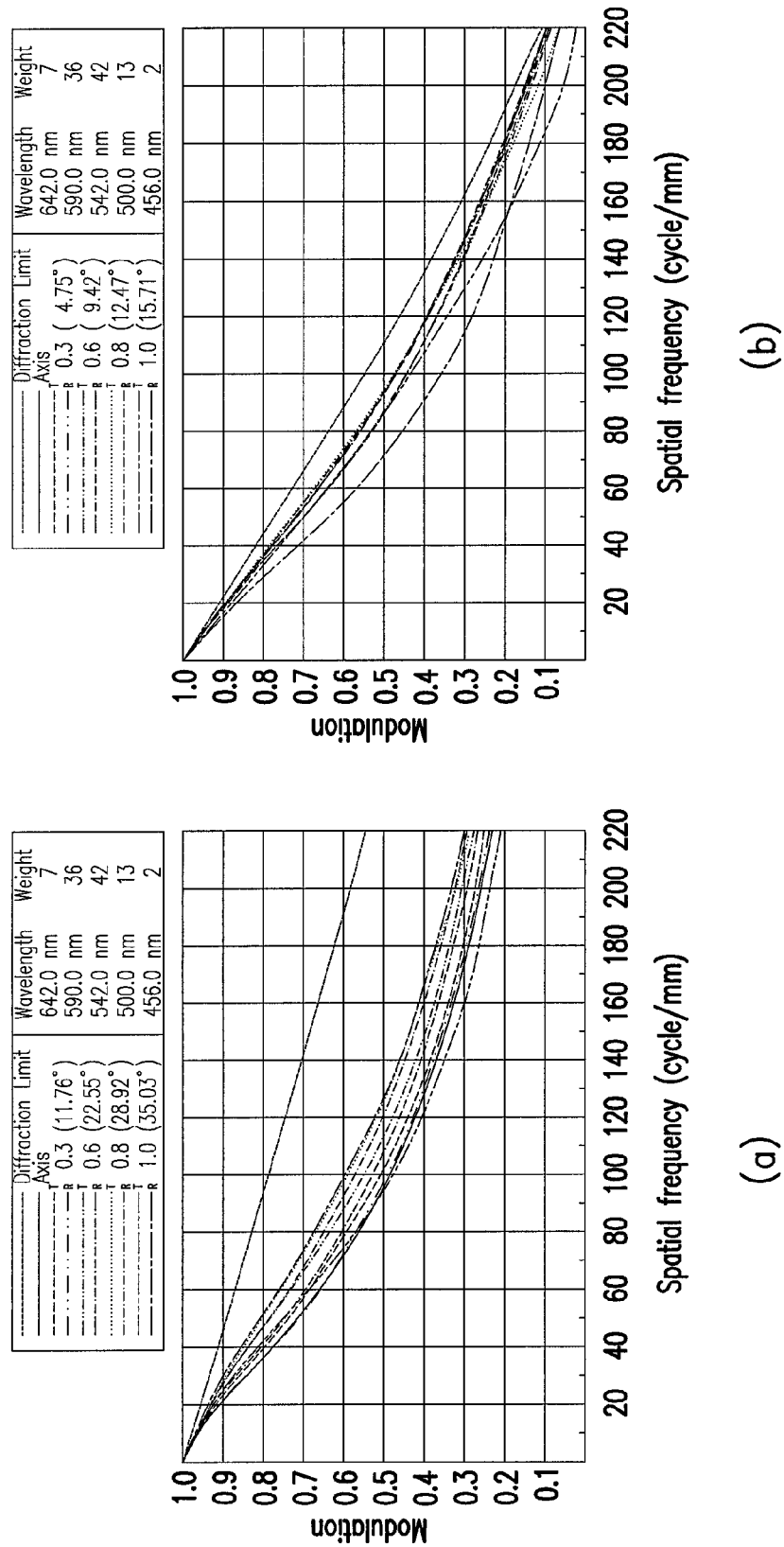

FIGS. 14-16 are characteristic simulation diagrams of an MTF varied along with spatial frequencies according to embodiments of the disclosure. According to simulation data of FIGS. 14-16, the characteristic of the MTF varied along with the spatial frequencies is also within a good operation range.

Corresponding to FIGS. 11-13, FIG. 14(a) illustrates a situation that the lens group 202 is configured at the wide-position and the object distance is 2 m. FIG. 14(b) illustrates a situation that the lens group 202 is configured at the tele-position and the object distance is 2 m. FIG. 15(a) illustrates a situation that the lens group 202 is configured at the wide-position and the object distance is 25 cm. FIG. 15(b) illustrates a situation that the lens group 202 is configured at the tele-position and the object distance is 25 cm. FIG. 16(a) illustrates a situation that the lens group 202 is configured at the wide-position and the object distance is 10 cm. FIG. 16(b) illustrates a situation that the lens group 202 is configured at the tele-position and the object distance is 10 cm.

Figure 17:
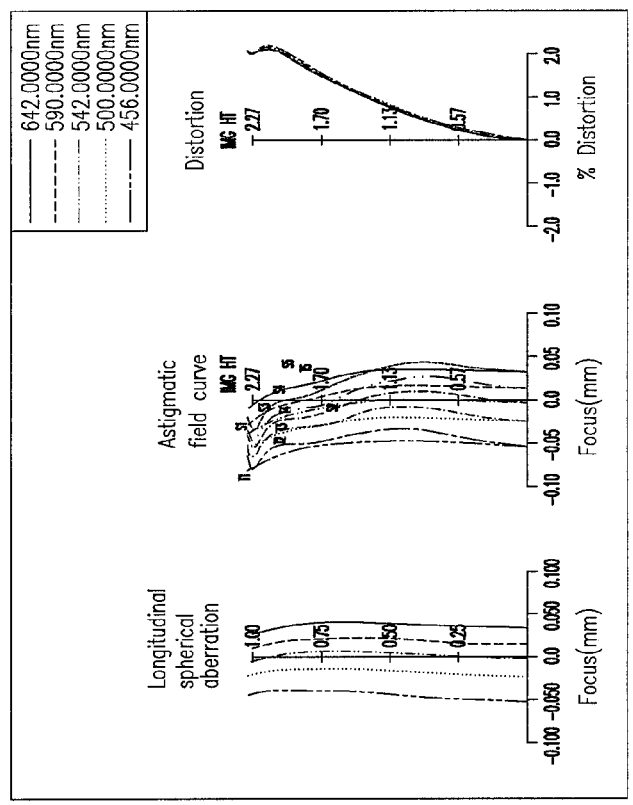
FIGS. 17-19 are characteristic simulation diagrams of longitudinal spherical aberration, astigmatic field curve and distortion according to embodiments of the disclosure.
Figure 17:
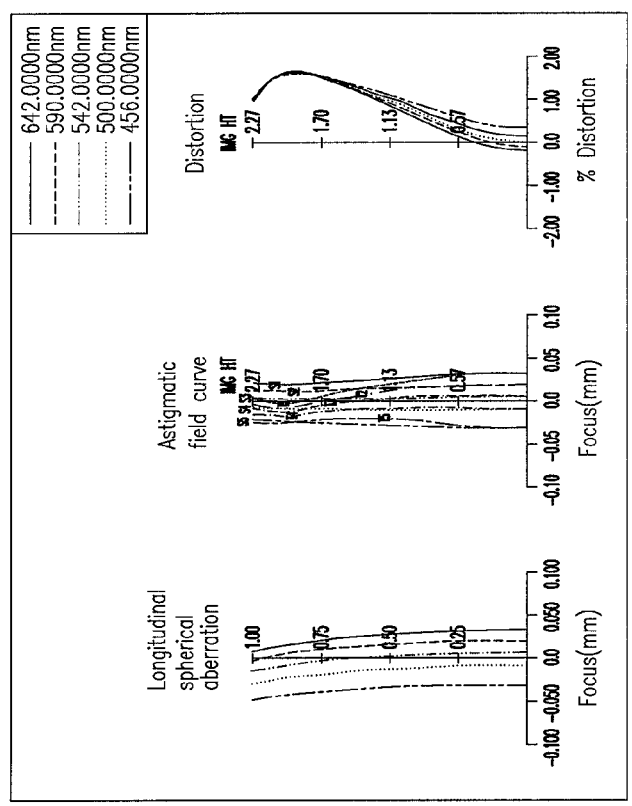
Figure 18:
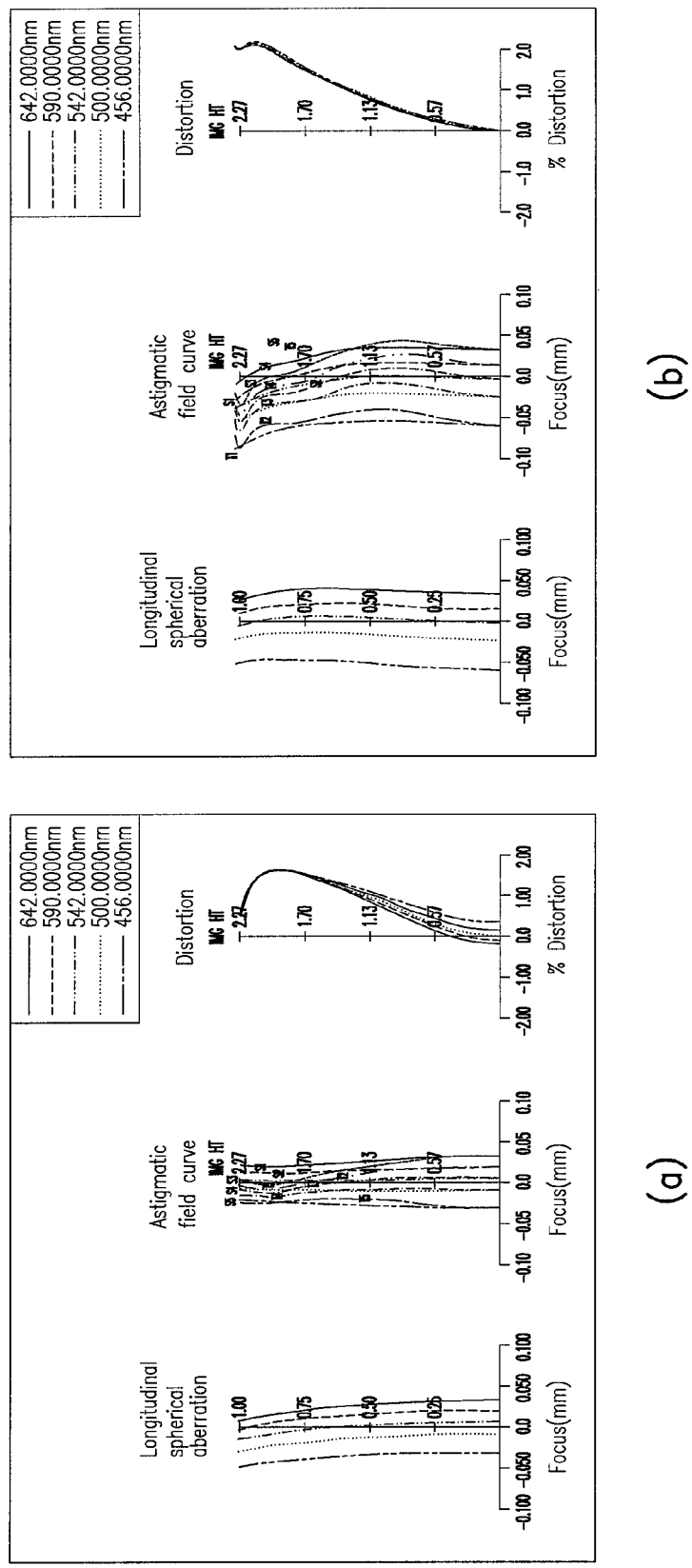
Figure 19:
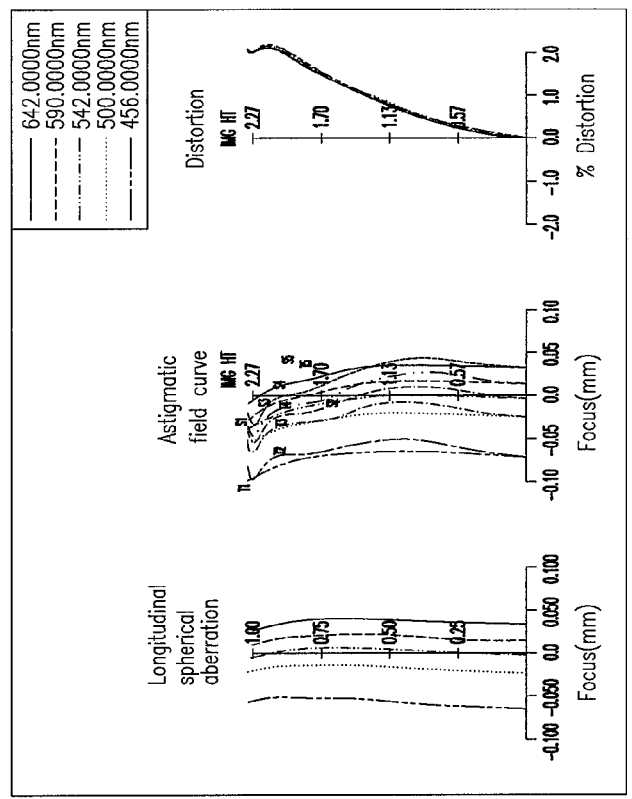
Figure 19:
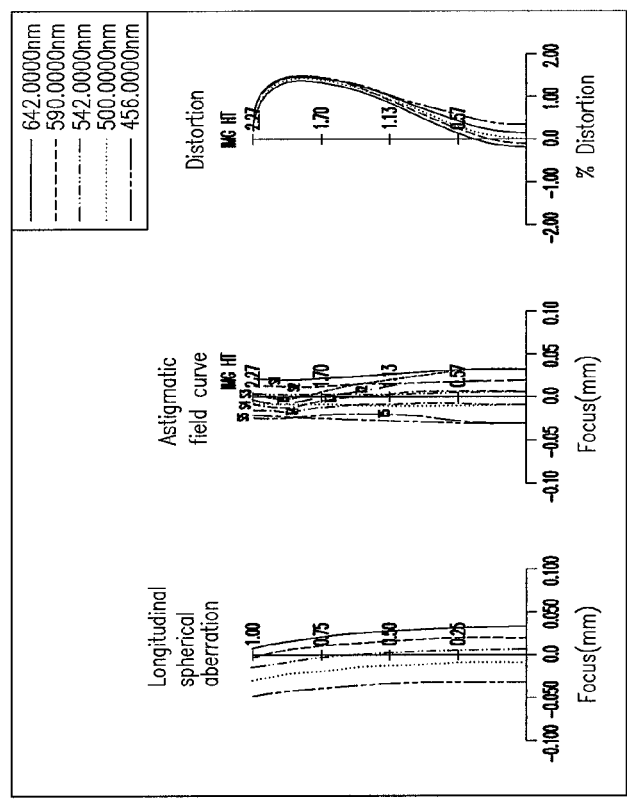

FIGS. 17-19 are characteristic simulation diagrams of longitudinal spherical aberration, astigmatic field curve and distortion according to embodiments of the disclosure. In FIGS. 17-19, the characteristics of the longitudinal spherical aberrations, the astigmatic field curves and the distortions corresponding to the operations of FIGS. 11-13 are illustrated. Similarly, the diagrams (a) at the left sides indicate situations of the wide-position, and the diagrams (b) at the right sides indicate situations of the tele-position. According to the displayed data, the present embodiment is also within a good operation range.

According to the embodiment of FIG. 11, surface types, radiuses, thickness and materials of the lenses are listed in following Tables 5-8:

TABLE 5

| Surface No. | Surface type | Radius (mm) | Thickness (mm) | (Nd, Vd) |
|---|---|---|---|---|
| Object | Spherical surface | 1.0E+18 | 2000 * 1 |  |
| 1 | Aspheric surface 1 | 9.17744281 | 2.5 | 1.694, 56.3 |
| 2 | Aspheric surface 2 | 2.5508006 | 6.058 * 2 |  |
| 3 | Aspheric surface 3 | 5.50214164 | 2.41539113 | 1.53, 55.7 |
| 4 | Aspheric surface 4 | −6.1794773 | 0.30265106 |  |
| 5 | Aspheric surface 5 | 4.4 | 2 | 1.639, 23 |
| 6 | Aspheric surface 6 | 2.18587322 | 0.3397583 |  |
| 7 | Aspheric surface 7 | 6.3 | 0.7 | 1.53, 55.7 |
| 8 | Aspheric surface 8 | −8.9138882 | 0.6 |  |
| Stop | Spherical surface | 1.0E+18 | 0.1 |  |
| 10 | Spherical surface | 1.0E+18 | 0.3 | 1.51, 56.4 |
| 11 | Spherical surface | 1.0E+18 | 0.31 * 3 | 1.48, 38.4 |
| 12 | Spherical surface | −150 * 5 | 0.34 * 4 | 1.39, 58.7 |
| 13 | Spherical surface | 1.0E+18 | 0.55 | 1.51, 56.4 |
| 14 | Spherical surface | 1.0E+18 | 0.84095 * 6 |  |
| 15 | Aspheric surface 9 | 3.7918 | 0.1 | 1.639, 23 |
| 16 | Aspheric surface 10 | 4.41093912 | 0.59535879 |  |

TABLE 5-continued

| Surface No. | Surface type | Radius (mm) | Thickness (mm) | (Nd, Vd) |
|---|---|---|---|---|
| 17 | Spherical surface | 1.0E+18 | 0.3 | 1.51, 56.4 |
| 18 | Spherical surface | 1.0E+18 | 0.2 | |
| Image | Spherical surface | 1.0E+18 | 0 | |

In the table 5, the surface types are combination of the spherical surfaces and the aspheric surfaces, and 18 surfaces are included from the left to the right, i.e. from the lens 200 to the imaging plane 212 behind the image sensor panel 206. The imaging plane 212 and the image sensor panel 206 are allowed to be slightly shifted. The thickness refers to a thickness extending rightwards along the optical axis from the surface. The material is represented by a refraction index Nd and an abbe number Vd, wherein variations of the values marked with "*" are described by the table 8.

Figure 20:
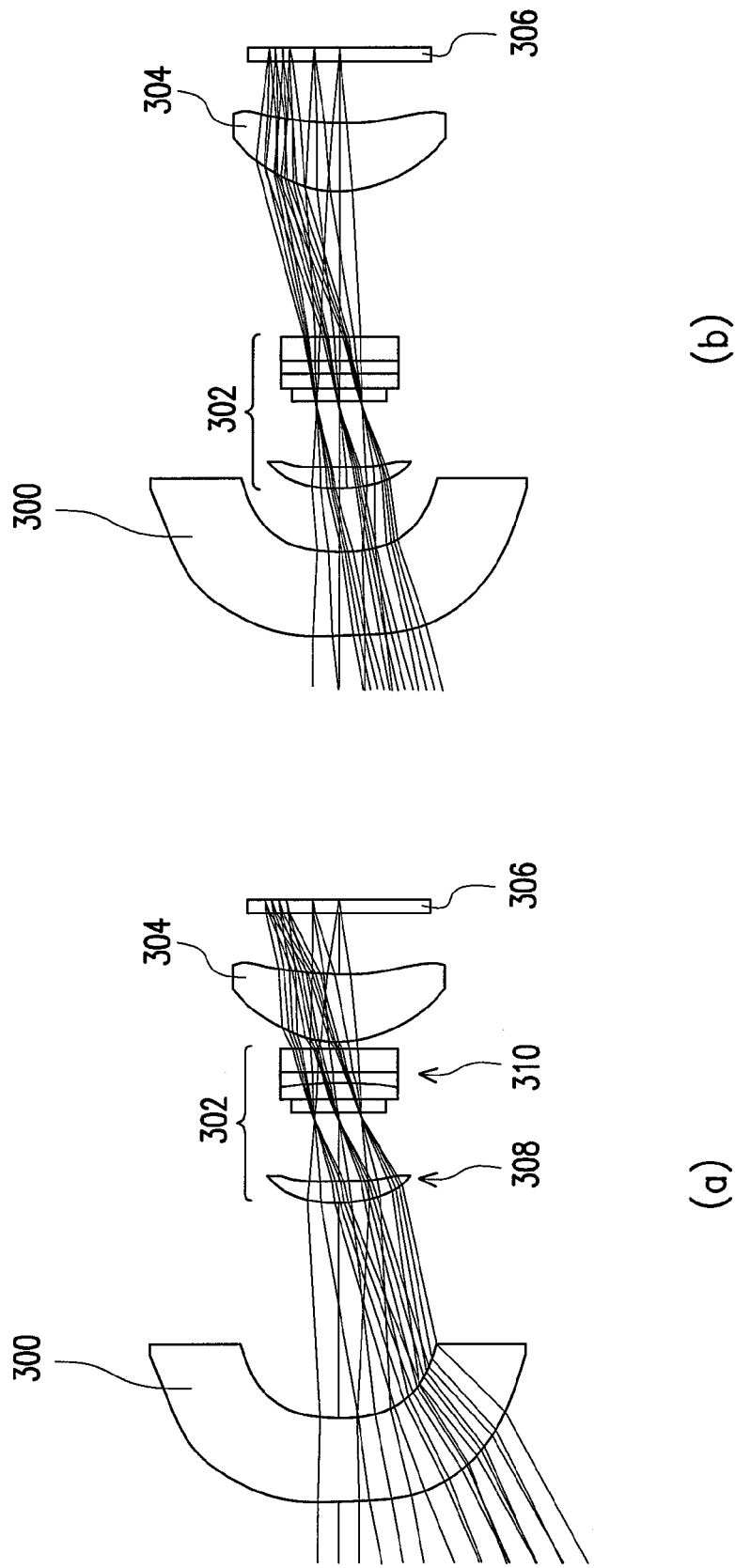
FIGS. 20-22 are cross-sectional views of a zoom camera module corresponding to different object distances according to another embodiment of the disclosure.
Figure 21:
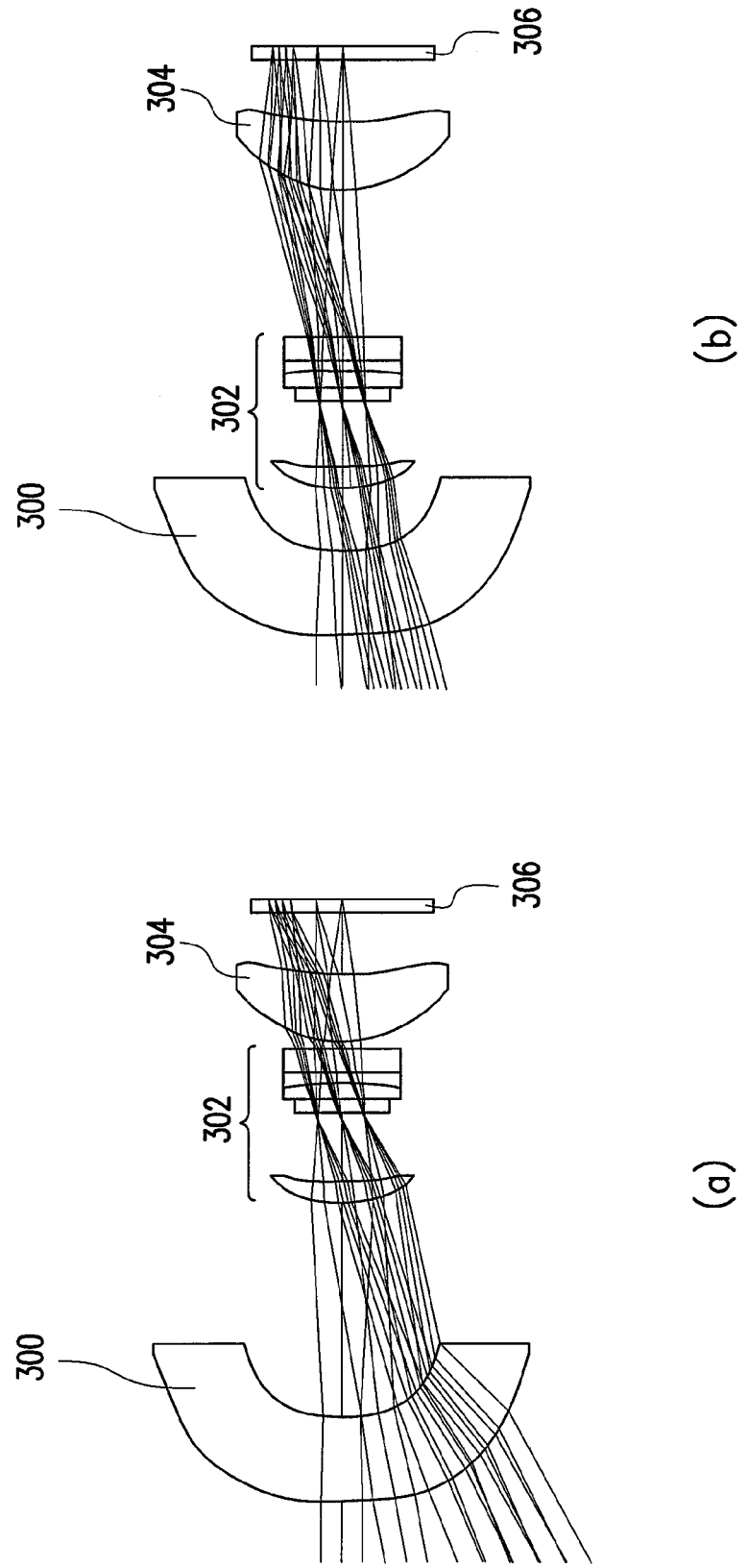
Figure 22:
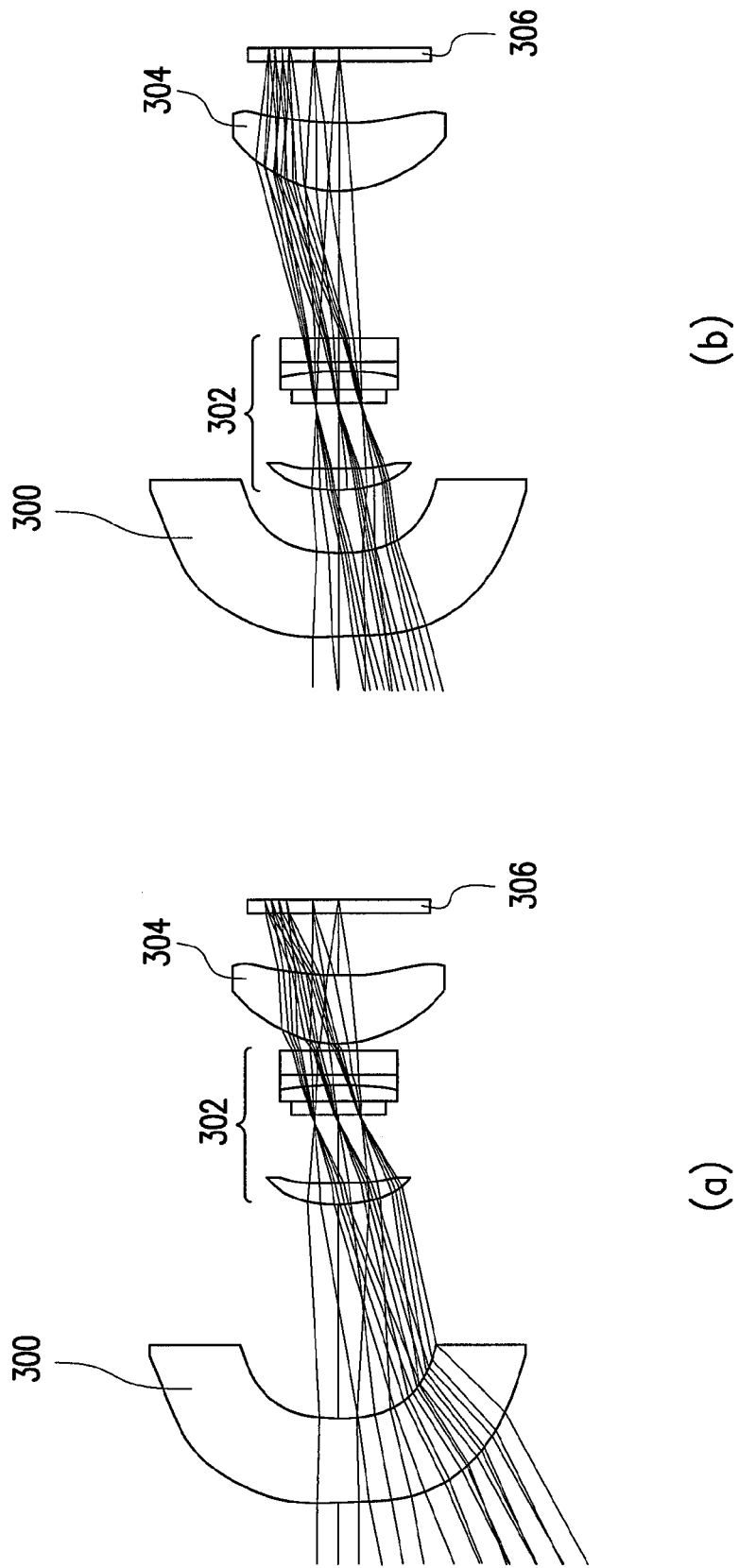

Patterns of the aspheric surfaces are listed in the table 6 and the table 7. Table 8 lists the positions corresponding to the wide-position and the tele-position in a case of the three object distances of 2 m, 25 cm and 10 cm, which correspond to the thickness of the table 5.

object on an image sensor panel 306. FIGS. 20-22 respectively illustrate situations corresponding to the object distances of 2 m, 25 cm and 10 cm, and operation mechanisms thereof are the same to that of the aforementioned embodiment, and therefore detailed description thereof is not repeated.

A characteristic of the present embodiment is a simplified design of the lens group 302. The lens group 302 includes a liquid lens unit 310 and a sub-lens group 308, wherein the sub-lens group 308 is designed to have a single lens. A stop is disposed between the sub-lens group 308 and the liquid lens unit 310 for limiting a range of incident light entering the liquid lens unit 310. The stop provides the effect as usually known.

TABLE 6

| | Aspheric surface 1 | Aspheric surface 2 | Aspheric surface 3 | Aspheric surface 4 | Aspheric surface 5 |
|---|---|---|---|---|---|
| Y radius | 9.2625495 | 2.5279222 | 5.3805509 | −5.493353 | 4.52282 |
| Cone constant | 0 | −0.680596 | 0 | 0 | 0 |
| $4^{th}$ coefficient | 0.001488 | −0.004371 | −0.001652 | 0.002169 | −0.004757 |
| $6^{th}$ coefficient | 1.58E−5 | −0.000123 | −1.17E−4 | −6.71E−5 | −0.000301 |
| $8^{th}$ coefficient | −2.91E−8 | 3.68E−6 | 1.04E−7 | 6.59E7 | −4.83E−06 |
| $10^{th}$ coefficient | 4.33E−10 | −9.56E−8 | 2.94E−8 | 2.18E−8 | 7.48E−6 |

TABLE 7

| | Aspheric surface 6 | Aspheric surface 7 | Aspheric surface 8 | Aspheric surface 9 | Aspheric surface 10 |
|---|---|---|---|---|---|
| Y radius | 2.149977 | 6.3 | −9.797463 | 3.819075 | 5.371575 |
| Cone constant | −0.601283 | 0 | 0 | −2.062262 | 1.942634 |
| $4^{th}$ coefficient | 0.002159 | 0.044674 | 0.026006 | −0.00633 | −0.017939 |
| $6^{th}$ coefficient | −0.0008 | 0.003185 | 0.00272 | 0.002005 | 0.001278 |
| $8^{th}$ coefficient | 0.000132 | 8.41E−5 | −0.001386 | −0.000129 | 0.0003 |
| $10^{th}$ coefficient | −4.69E−5 | 0.000519 | 0.000986 | −1.11E−5 | −9.61E−5 |

TABLE 8

| | *1 | *2 | *3 | *4 | *5 | *6 | F/# | Effect focal length |
|---|---|---|---|---|---|---|---|---|
| Wide | 2000 | 6.518337 | 0.31 | 0.34 | −150 | 0.824866 | 3 | 3.2 |
| Tele | 2000 | 2 | 0.31 | 0.34 | −150 | 5.343202 | 6.493 | 8 |
| Wide | 250 | 6.518337 | 0.35 | 0.3 | −16.346 | 0.824866 | 3.017 | 3.15 |
| Tele | 250 | 2 | 0.35 | 0.3 | −16.1303 | 5.343202 | 6.472 | 7.77 |
| Wide | 100 | 6.518337 | 0.39 | 0.26 | −6.62236 | 0.824866 | 2.998 | 3.08 |
| Tele | 100 | 2 | 0.39 | 0.26 | −6.68092 | 5.343202 | 6.442 | 7.43 |

Figure 23:
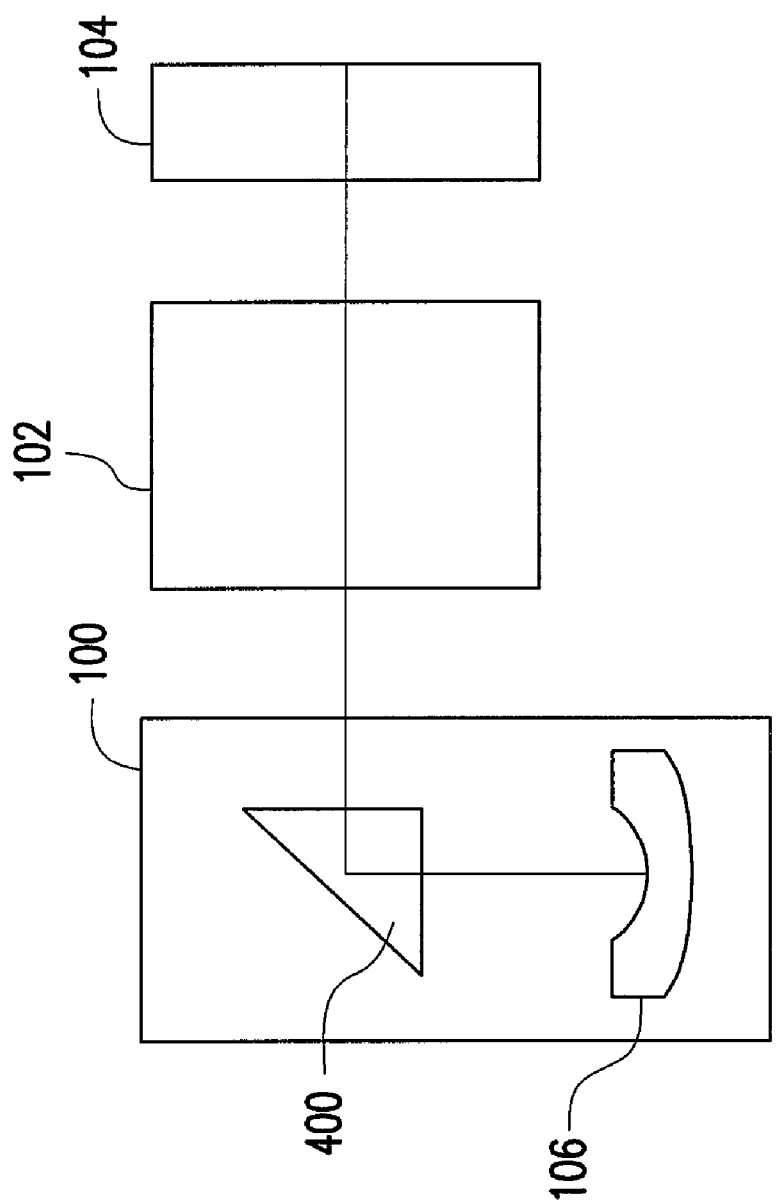
FIG. 23 is a cross-sectional view of a zoom camera module corresponding to different object distances according to another embodiment of the disclosure.

FIGS. 20-22 are cross-sectional views of a zoom camera module corresponding to different object distances according to another embodiment of the disclosure. Referring to FIG. 20(*a*), the zoom camera module of the present embodiment includes three lens groups 300, 302 and 304 for imaging an FIG. 23 is a cross-sectional view of a zoom camera module corresponding to different object distances according to another embodiment of the disclosure. Referring to FIG. 23, according to a spatial arrangement, a prism 400 can be added to the lens group 100 closed to the object side for changing a path of the optical axis. Since a position of the lens group 100 is fixed, a position of the prism 400 is also fixed, and is not varied along with a movement of the lens group 102 during zooming. In other words, though the prism 400 is added, the operation and design mechanisms of the zoom camera module are maintained unchanged.

The zoom camera module of the disclosure uses an optical design of a liquid lens, and only one lens group is required to be moved during a zooming process, and none optical device is moved during a focusing process. Moreover, the picture is maintained a high quality when taking a close-up shot, and arrangement of liquid sequence of the liquid lens is allowed to have a greater degree of freedom, so that the currently available liquid lens in various structures can be freely and directly used. In the disclosure, the liquid lens has effects of compensating an image plane position during zooming (changing a magnification) and focusing (compensating the image plane position in a case of same magnification and different object distances), to provide a higher optical zooming multiple of 2.5, and a larger stop F/#=2.8 (brighter, and a higher resolution power), which can be applied to the liquid lens with a smaller aperture and a sensor with more pixels (2M ¼") to achieve a better image aberration correction capability and implement a design with a low cost. The liquid lens technique is a developed conventional technique, which can be used in the zoom camera module.

A suitable configuring position of the stop can effectively reduce a demand of the aperture of the liquid lens, and since the aperture of the current liquid lens is such as 3.4 mm, and the configuring position of the stop is preferably closed to the liquid lens. A diagonal length of a high definition (above 2 million pixels) image sensor is probably greater than 4.4 mm, the stop and the liquid lens are required to be disposed apart from the image sensor based on a space limitation. To ensure a light beam can all pass through the liquid lens without a situation that a great amount of off-axis light beam is shielded by the liquid lens and causes a brightness difference between a central area and an edge of the image sensor being greater than 50%, the stop is disposed closed to the liquid lens, so that most of near-axis and off-axis light beam can pass through the liquid lens. According to the optical zoom design of the disclosure, the camera module may have brighter performance and have a higher resolution power.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A zoom camera module, comprising:
   a first lens group having a first total optical power, disposed on an optical axis at a fixed position;
   a second lens group having a second total optical power, disposed on the optical axis, and capable of being moved back and forth along the optical axis to achieve zooming and focusing simultaneously, the second lens group comprising:
   a liquid lens unit and, having an adjustable optical power; and
   at least one lens with a non-zero optical power, wherein the at least one lens and the liquid lens unit are separately or integrally configured; and
   a third lens group having a non-zero third total optical power, disposed on the optical axis at a fixed position,
   wherein the second lens group is disposed between the first lens group and the third lens group,
   wherein the first total optical power is negative and the second total optical power is positive and the non-zero third total optical power of the third lens group is negative.

2. The zoom camera module as claimed in claim 1, wherein the second lens group is moved along the optical axis to achieve zooming, and a moving direction from an image side to an object side is for changing from a wide-position to a tele-position.

3. The zoom camera module as claimed in claim 1, wherein the liquid lens unit is formed by two kinds of liquid, the two kinds of liquid are immiscible to form an interface, and have different refraction index and similar densities , and a curvature of the interface is changed according to an electrowetting mechanism.

4. The zoom camera module as claimed in claim 1, wherein the first lens group comprises a prism for changing a direction of the optical axis.

5. The zoom camera module as claimed in claim 1, wherein the second lens group further comprises a stop.

6. The zoom camera module as claimed in claim 5, wherein the stop is disposed on the liquid lens unit or on the at least one lens.

7. The zoom camera module as claimed in claim 5, wherein the stop of the second lens group is located in front of the at least one lens and the liquid lens unit and is closer to the first lens group, or is located behind the at least one lens and the liquid lens unit and is apart from the first lens group.

8. The zoom camera module as claimed in claim 5, wherein the stop is disposed between the liquid lens unit and the at least one lens.

9. The zoom camera module as claimed in claim 1, wherein the liquid lens unit of the second lens group comprises:
   a first transparent substrate, being a flat substrate or a curved substrate, and facing to the object side;
   a second transparent substrate, being a flat substrate or a curved substrate, and facing to the image side;
   an outer wall structure, forming a containing space together with the first transparent substrate and the second transparent substrate;
   a first liquid, having a first refraction index, and filled in the containing space; and
   a second liquid, having a second refraction index, filled in the containing space, and being immiscible to the first liquid, wherein the first liquid and the second liquid form the interface,
   wherein the curvature of the interface is changed according to an external electrical control.

10. The zoom camera module as claimed in claim 9, wherein the liquid lens unit and the at least one lens of the second lens group are integrally configured, wherein he first transparent substrate is a curved substrate, and provides an additional optical power in combination with an optical power of the at least one lens in the second lens group as required.

11. The zoom camera module as claimed in claim 10, wherein the at least one lens is the first transparent substrate.

12. The zoom camera module as claimed in claim 9, wherein the liquid lens unit and the at least one lens of the second lens group are integrally configured, wherein the second transparent substrate is a curved substrate, and provides the additional optical power in combination with the optical power of the at least one lens in the second lens group as required.

13. The zoom camera module as claimed in claim 12, wherein the at least one lens is the second transparent substrate.

14. The zoom camera module as claimed in claim 9, wherein the first transparent substrate and the second transparent substrate of the liquid lens unit are all flat substrates.

15. The zoom camera module as claimed in claim 9, wherein the liquid lens unit and the at least one lens of the second lens group are separately configured.

16. The zoom camera module as claimed in claim 1, wherein the liquid lens unit in operation comprises:
  compensating an image plane position when the second lens group is moved along the optical axis for zooming; and
  compensating the image plane position generated according to a different object plane position when a magnification of the second lens group remains at a same level.

17. The zoom camera module as claimed in claim 1, wherein a maximum effective aperture of the liquid lens unit is smaller than a diagonal of an image sensor plane.

18. The zoom camera module as claimed in claim 1, wherein the at least one lens in the second lens group is positive optical power.

19. The zoom camera module as claimed in claim 1, wherein the at least one lens and the liquid lens unit of the second lens group are separately configured.

20. The zoom camera module as claimed in claim 19, wherein the second lens group further comprises a stop.

21. The zoom camera module as claimed in claim 20, wherein the stop is disposed between the at least one lens and the liquid lens unit.

* * * * *